(12) United States Patent
Miki

(10) Patent No.: US 8,479,099 B2
(45) Date of Patent: Jul. 2, 2013

(54) GROUP MANAGEMENT APPARATUS AND GROUP MANAGEMENT SYSTEM

(75) Inventor: Toshiyuki Miki, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 224 days.

(21) Appl. No.: 13/001,002

(22) PCT Filed: Jun. 26, 2009

(86) PCT No.: PCT/JP2009/002936
§ 371 (c)(1),
(2), (4) Date: Dec. 22, 2010

(87) PCT Pub. No.: WO2010/001560
PCT Pub. Date: Jan. 7, 2010

(65) Prior Publication Data
US 2011/0098863 A1 Apr. 28, 2011

(30) Foreign Application Priority Data
Jul. 1, 2008 (JP) .................................. 2008-172607

(51) Int. Cl.
| | |
|---|---|
| *G06F 15/177* | (2006.01) |
| *G06F 3/00* | (2006.01) |
| *G06F 3/048* | (2006.01) |
| *G06F 11/30* | (2006.01) |
| *G06F 11/00* | (2006.01) |
| *G05B 15/00* | (2006.01) |
| *G05B 21/00* | (2006.01) |
| *G05B 13/00* | (2006.01) |
| *G01M 1/38* | (2006.01) |
| *G05D 23/00* | (2006.01) |
| *G21C 17/00* | (2006.01) |

(52) U.S. Cl.
USPC ............. 715/736; 715/740; 715/772; 700/83; 700/277; 700/278; 702/183; 702/188

(58) Field of Classification Search
USPC .................. 700/83, 275; 702/127, 182, 185, 702/186, 188; 705/1.1, 2, 3, 7.11, 7.38–7.42, 705/28; 715/733–737, 740, 764, 771–773, 715/853–855, 866
See application file for complete search history.

(56) References Cited

U.S. PATENT DOCUMENTS
6,473,675 B2 * 10/2002 Sample ............................ 701/3
6,751,630 B1 * 6/2004 Franks et al. ....................... 1/1
(Continued)

FOREIGN PATENT DOCUMENTS
| CN | 1616897 A | 5/2005 |
|---|---|---|
| JP | 9-196444 A | 7/1997 |

(Continued)

OTHER PUBLICATIONS

International Search Report of corresponding PCT Application No. PCT/JP2009/002936.

(Continued)

*Primary Examiner* — Crystal J Barnes-Bullock
(74) *Attorney, Agent, or Firm* — Global IP Counselors

(57) ABSTRACT

A group management apparatus manages, as a plurality of groups, numerous installation devices installed in a plurality of buildings. The group management apparatus includes an acquiring component, a summarizing component and a screen generating component. The Acquiring component acquires operating data of the numerous installation devices via controllers. The controllers are placed in the buildings and control the numerous installation devices inside the buildings. The summarizing component summarizes, per group, operating data values that are values represented by the operating data. The screen generating component generates a screen in which results, with respect to the plurality of groups, of the operating data values having been summarized by the summarizing component are juxtaposed.

18 Claims, 13 Drawing Sheets

U.S. PATENT DOCUMENTS

| | | | |
|---|---|---|---|
| 7,356,478 B1 * | 4/2008 | Kohli | 705/2 |
| 7,384,267 B1 * | 6/2008 | Franks et al. | 434/219 |
| 2004/0255601 A1 | 12/2004 | Kwon et al. | |
| 2005/0097902 A1 | 5/2005 | Kwon et al. | |
| 2009/0204262 A1 | 8/2009 | Nishimura | |

FOREIGN PATENT DOCUMENTS

| | | |
|---|---|---|
| JP | 2002-2156 A | 1/2002 |
| JP | 2003-216715 A | 7/2003 |
| JP | 2008-75990 A | 4/2008 |
| KR | 100529907 B1 | 11/2005 |
| KR | 20070054720 A | 5/2007 |

OTHER PUBLICATIONS

International Preliminary Report of corresponding PCT Application No. PCT/JP2009/002936.

Office Action of corresponding Chinese Application No. 200980124895.7 dated Sep. 12, 2012.

Office Action of corresponding Korean Application No. 10-2011-7001198 dated Oct. 8, 2012.

* cited by examiner

FIG. 10

| EVALUATION ITEMS | INTENSIVE ELECTRICAL ENERGY CONSUMPTION COMBINED VALUES (Ens) | SECONDARY ELEMENTS |
|---|---|---|
| ENERGY-INTENSIVE CONSUMPTION | ELECTRICAL ENERGY CONSUMPTION | SET TEMPERATURE, EXTERNAL LOAD, INTERNAL LOAD, SKELETON HEAT STORAGE, OPERATING TIME, AGE, COP, APF, NUMBER, HORSEPOWER |
| TEMPERATURE DEVIATION | DIFFERENCE BETWEEN SET TEMPERATURE AND SUCTION TEMPERATURE | NUMBER, AGE, LOAD DESIGN VALUE, HORSEPOWER |
| COMFORT | DISCOMFORT INDEX | SET TEMPERATURE, EXTERNAL LOAD, OPERATING TIME |

FIG. 13

GROUP MANAGEMENT APPARATUS AND GROUP MANAGEMENT SYSTEM

CROSS-REFERENCE TO RELATED APPLICATIONS

This U.S. National stage application claims priority under 35 U.S.C. §119(a) to Japanese Patent Application No. 2008-172607, filed in Japan on Jul. 1, 2008, the entire contents of which are hereby incorporated herein by reference.

TECHNICAL FIELD

The present invention relates to a group management apparatus that manages a plurality of installation devices as groups and to a group management system that uses the group management apparatus.

BACKGROUND ART

Conventionally, in a building that uses numerous installation devices like an office building or a tenant building, a single controller is placed in one location inside the building, and the numerous installation devices are controlled using that controller (see Japanese Patent Publication No. 9-196444). Further, this controller acquires operating data from the numerous installation devices to effectively manage the numerous installation devices and evaluates the operating states of the numerous installation devices installed inside the building.

SUMMARY

Technical Problem

On the other hand, in a property in which a plurality of buildings are located in a single management domain like a hospital or a university, for example, a controller is placed in each building, so a plurality of controllers are placed in the single management domain. The controllers placed in each building evaluate the operating states of the numerous installation devices installed in the same buildings. Based on the results obtained by the evaluations, measures for efficiently controlling the installation devices are then devised. However, if the operating states of the numerous installation devices installed inside the property are evaluated using the controllers placed in each building, it is difficult to fairly evaluate the operating states of the installation devices in terms of the management domain overall.

It is an object of the present invention to provide a group management apparatus or a group management system with which the operating states of numerous installation devices can be seen in one view and can be fairly evaluated in a management domain in which a plurality of buildings are located.

Solution to the Problem

A group management apparatus pertaining to a first aspect of the invention is a group management apparatus that manages, as a plurality of groups, numerous installation devices installed in a plurality of buildings and comprises an acquiring component, a summarizing component, and a screen generating component. The acquiring component acquires operating data of the numerous installation devices via controllers. The controllers are placed in each building and control the numerous installation devices inside the buildings. The summarizing component summarizes operating data values per group. The operating data values are values represented by the operating data. The screen generating component generates a screen in which the results, with respect to the plurality of groups, of the operating data values having been summarized by the summarizing component are juxtaposed.

In the group management apparatus pertaining to this aspect, the operating data of the numerous installation devices installed in the plurality of buildings are acquired via the controllers placed in each building. Moreover, the operating data values are summarized per group, and a screen is generated. In the screen, the results of the operating data values having been summarized are juxtaposed. The operating data values are, for example, electrical energy consumption values, temperature deviation values, and values representing indices of comfort.

Thus, the numerous installation devices installed in the plurality of buildings can be efficiently determined in one view. Further, the operating states of the installation devices can be fairly evaluated.

A group management apparatus pertaining to a second aspect of the invention is the group management apparatus pertaining to the first aspect of the invention, wherein the summarizing component compares individual operating data values or collective operating data values with individual operating data values or collective operating data values of other groups. The individual operating data values are operating data values of individual installation devices belonging to single groups. The collective operating data values are operating data values of all installation devices belonging to single groups.

In the group management apparatus pertaining to this aspect, individual operating data values of single groups are compared with individual operating data values of other groups or collective operating data values of single groups are compared with collective operating data values of other groups.

Thus, the states of each of the groups can be effectively determined.

A group management apparatus pertaining to a third aspect of the invention is the group management apparatus pertaining to the second aspect of the invention, wherein the summarizing component further judges whether or not the individual operating data values or the collective operating data values meet a predetermined condition. The predetermined condition, for example, is a state where an energy conservation measure is needed or a state where an energy conservation measure is being sufficiently taken or is a state where a temperature deviation measure is needed or a state where a temperature deviation measure is being sufficiently taken.

In the group management apparatus pertaining to this aspect, whether or not the individual operating data values or the collective operating data values meet the predetermined condition is further judged.

Thus, whether or not it is necessary to take some kind of measure in the individual installation devices included in the groups or in the groups overall can be determineed.

A group management apparatus pertaining to a fourth aspect of the invention is the group management apparatus pertaining to the third aspect of the invention, wherein the summarizing component further compares, per group, the individual operating data values or the collective operating data values with a predetermined reference value and judges whether or not the individual operating data values or the collective operating data values meet the predetermined condition.

In the group management apparatus pertaining to this aspect, the individual operating data values or the collective operating data values are further compared, per group, with the predetermined reference value, and whether or not the individual operating data values or the collective operating data values meet the predetermined condition is judged.

Thus, whether or not the individual operating data values or the collective operating data values meet the predetermined condition can be judged on the basis of the predetermined reference value.

A group management apparatus pertaining to a fifth aspect of the invention is the group management apparatus pertaining to any one of the second to fourth aspects of the invention, wherein the collective operating data values are mean values of the individual operating data values of installation devices belonging to single groups.

In the group management apparatus pertaining to this aspect, mean values of the individual operating data values are compared as the collective operating data values.

Thus, a group whose mean value is high or a group whose mean value is low compared to other groups can be determined.

A group management apparatus pertaining to a sixth aspect of the invention is the group management apparatus pertaining to any one of the second to fourth aspects of the invention, wherein the collective operating data values are totals of the individual operating data values of installation devices belonging to single groups.

In the group management apparatus pertaining to this aspect, totals of the individual operating data values are compared as the collective operating data values.

Thus, a group whose total is high or a group whose total is low compared to other groups can be determined.

A group management apparatus pertaining to a seventh aspect of the invention is the group management apparatus pertaining to any one of the third to sixth aspects of the invention, wherein the screen generating component generates a screen in which magnitude relations of installation devices meeting the predetermined condition in each of the groups can be compared.

In the group management apparatus pertaining to this aspect, the magnitude relations of single groups and other groups are comparably displayed in regard to installation devices meeting the predetermined condition. Examples of comparably displaying the magnitude relations include a case where the groups are arranged in descending or ascending order of the combined values of the individual operating data values of installation devices or the collective operating data values meeting the predetermined condition and a case where the combined values of the individual operating data values of installation devices or the collective operating data values meeting the predetermined condition are graphically displayed and the operating data values are indicated by the sizes of the graphics.

Thus, the extent of installation devices meeting the predetermined condition of the installation devices belonging to the groups can be easily compared with other groups.

A group management apparatus pertaining to an eighth aspect of the invention is the group management apparatus pertaining to the seventh aspect of the invention, wherein the screen generating component generates a screen in which specific values can be compared with overall values. The specific values are the individual operating data values of installation devices meeting the predetermined condition. The overall values are the operating data values of all installation devices.

In the group management apparatus pertaining to this aspect, a screen in which the specific values and the overall values can also be compared is generated.

Thus, the proportion of operating data values (specific values) of installation devices in a predetermined state occupying the operating data values (overall values) of all installation devices included in the groups can be determineed.

A group management apparatus pertaining to a ninth aspect of the invention is the group management apparatus pertaining to the eighth aspect of the invention, wherein the summarizing component determines the numbers of installation devices meeting the predetermined condition in each of the groups. Further, the screen generating component includes the numbers in the screen.

In the group management apparatus pertaining to this aspect, the numbers of installation devices meeting the predetermined condition is determineed, and those numbers are displayed on the screen.

Thus, it is possible to guess how much effect can be obtained by a measure.

A group management apparatus pertaining to a tenth aspect of the invention is the group management apparatus pertaining to any one of the second to seventh aspects of the invention and further comprises a classification information storage area. The classification information storage area stores classification information for classifying the numerous installation devices into the groups. Further, the summarizing component summarizes the individual operating data values or the collective operating data values per each of the groups into which the numerous installation devices have been classified by the classification information.

In the group management apparatus pertaining to this aspect, the classification information for classifying the numerous installation devices into the groups is stored. The operating data values are summarized per each of the groups into which the numerous installation devices have been classified by the classification information. Here, the classification information is, for example, physical conditions including building type and building orientation, temporal conditions, etc.

Thus, the numerous installation devices can be classified into a variety of groups.

A group management apparatus pertaining to an eleventh aspect of the invention is the group management apparatus pertaining to any one of the first to tenth aspects of the invention and further comprises an evaluation item storage area. The evaluation item storage area stores a plurality of items for evaluating operating states of the numerous installation devices. Further, the summarizing component evaluates the operating states on the basis of several items of the plurality of items or all items of the plurality of items. Moreover, the screen generating component generates a screen in which the evaluation results based on the plurality of items can be checked en bloc.

In the group management apparatus pertaining to this aspect, the plurality of items for evaluating the operating states of the numerous installation devices are further stored. The operating states are evaluated on the basis of several items of the plurality of items or all items of the plurality of items. Further, the screen in which the evaluation results based on the plurality of items can be checked en bloc is generated.

Thus, the operating states of the installation devices can be evaluated from many angles.

A group management apparatus pertaining to a twelfth aspect of the invention is the group management apparatus pertaining to any one of the fourth to eleventh aspects of the invention and further comprises a reference value setting component. The reference value setting component sets the predetermined reference value on the basis of the operating data values that have been acquired from the numerous installation devices by the acquiring component.

In the group management apparatus pertaining to this aspect, the predetermined reference value is set on the basis of the operating data values that have been acquired from the numerous installation devices. For example, installation devices with the highest electrical energy consumption values among the installation devices of each group are identified, and the lowest electrical energy consumption value among the identified installation devices is used as the reference value, or a value obtained by subtracting a predetermined value from the lowest electrical energy consumption value among the identified installation devices is used as the reference value.

Thus, the operating states of the installation devices of the groups overall can be efficiently evaluated.

A group management apparatus pertaining to a thirteenth aspect of the invention is the group management apparatus pertaining to any one of the first to twelfth aspects of the invention, wherein the plurality of buildings are included in a single management domain.

In the group management apparatus pertaining to this aspect, the numerous installation devices installed in the plurality of buildings included in the single management domain are managed as a plurality of groups. The single management domain is a single, closed domain in which the facilities or buildings that become the management targets are owned by the same or associated owners, such as a school, a hospital, or a company having a plurality of facilities or buildings, for example.

Thus, the scattered installation devices can be efficiently managed.

A group management system pertaining to a fourteenth aspect of the invention is a group management system that manages, as a plurality of groups, numerous installation devices installed in a plurality of buildings and comprises controllers and a group management apparatus. The controllers are placed in each building and control numerous installation devices installed inside the buildings. The group management apparatus is connected to the controllers and manages the numerous installation devices as groups via the controllers. Further, the group management apparatus has an acquiring component, a summarizing component, and a screen generating component. The acquiring component acquires operating data of the numerous installation devices via the controllers. The summarizing component summarizes operating data values per group. The operating data values are values represented by the operating data. The screen generating component generates a screen in which the results, with respect to the plurality of groups, of the operating data values having been summarized by the summarizing component are juxtaposed.

In the group management system pertaining to this aspect, the operating data of the numerous installation devices installed in the plurality of buildings are acquired via the controllers placed in each building. Moreover, the operating data values are summarized per group, and a screen is generated. In the screen, the results of the operating data values having been summarized are juxtaposed. The operating data values are, for example, electrical energy consumption values, temperature deviation values, and values representing indices of comfort.

Thus, the numerous installation devices installed in the plurality of buildings can be efficiently determined in one view. Further, the operating states of the installation devices can be fairly evaluated.

A group management method pertaining to a fifteenth aspect of the invention is a group management method of managing, as a plurality of groups, numerous installation devices installed in a plurality of buildings and comprises an acquiring step, a summarizing step, and a screen generating step. In the acquiring step, operating data of the numerous installation devices are acquired via controllers. The controllers are placed in each building and control the numerous installation devices inside the buildings. In the summarizing step, operating data values are summarized per group. The operating data values are values represented by the operating data. In the screen generating step, a screen is generated. In the screen, the results, with respect to the plurality of groups, of the operating data values having been summarized in the summarizing step are juxtaposed.

In the group management method pertaining to this aspect, the operating data of the numerous installation devices installed in the plurality of buildings are acquired via the controllers placed in each building. Moreover, the operating data values are summarized per group, and a screen is generated. In the screen, the results of the operating data values having been summarized are juxtaposed. The operating data values are, for example, electrical energy consumption values, temperature deviation values, and values representing indices of comfort.

Thus, the numerous installation devices installed in the plurality of buildings can be efficiently determined in one view. Further, the operating states of the installation devices can be fairly evaluated.

A group management program pertaining to a sixteenth aspect of the invention is a group management program that is executed in a computer to manage, as a plurality of groups, numerous installation devices installed in a plurality of buildings and comprises an acquiring step, a summarizing step, and a screen generating step. In the acquiring step, operating data of the numerous installation devices are acquired via controllers. The controllers are placed in each building and control the numerous installation devices inside the buildings. In the summarizing step, operating data values are summarized per group. The operating data values are values represented by the operating data. In the screen generating step, a screen is generated. In the screen, the results, with respect to the plurality of groups, of the operating data values having been summarized in the summarizing step are juxtaposed.

In the group management program pertaining to this aspect, the operating data of the numerous installation devices installed in the plurality of buildings are acquired via the controllers placed in each building. Moreover, the operating data values are summarized per group, and a screen is generated. In the screen, the results of the operating data values having been summarized are juxtaposed. The operating data values are, for example, electrical energy consumption values, temperature deviation values, and values representing indices representing comfort.

Thus, the numerous installation devices installed in the plurality of buildings can be efficiently determined in one view. Further, the operating states of the installation devices can be fairly evaluated.

Advantageous Effects of the Invention

In the group management apparatus pertaining to the first aspect of the invention, the numerous installation devices installed in the plurality of buildings can be efficiently determined in one view, and the operating states of the installation devices can be fairly evaluated.

In the group management apparatus pertaining to the second aspect of the invention, the states of each of the groups can be effectively determined.

In the group management apparatus pertaining to the third aspect of the invention, whether or not it is necessary to take some kind of measure in the individual installation devices included in the groups or in the groups overall can be determineed.

In the group management apparatus pertaining to the fourth aspect of the invention, whether or not the individual operating data values or the collective operating data values meet the predetermined condition can be judged on the basis of the predetermined reference value.

In the group management apparatus pertaining to the fifth aspect of the invention, a group whose mean value is high or a group whose mean value is low compared to other groups can be determined.

In the group management apparatus pertaining to the sixth aspect of the invention, a group whose total is high or a group whose total is low compared to other groups can be determined.

In the group management apparatus pertaining to the seventh aspect of the invention, the extent of installation devices meeting the predetermined condition of the installation devices belonging to the groups can be easily compared with other groups.

In the group management apparatus pertaining to the eighth aspect of the invention, the proportion of operating data values (specific values) of installation devices in a predetermined state occupying the operating data values (overall values) of all installation devices included in the groups can be determineed.

In the group management apparatus pertaining to the ninth aspect of the invention, an idea of the effectiveness of a measure can be arrived at.

In the group management apparatus pertaining to the tenth aspect of the invention, the numerous installation devices can be classified into a variety of groups.

In the group management apparatus pertaining to the eleventh aspect of the invention, the operating states of the installation devices can be evaluated from many angles.

In the group management apparatus pertaining to the twelfth aspect of the invention, the operating states of the installation devices of the groups overall can be efficiently evaluated.

In the group management apparatus pertaining to the thirteenth aspect of the invention, the scattered installation devices can be efficiently managed.

In the group management system pertaining to the fourteenth aspect of the invention, the numerous installation devices installed in the plurality of buildings can be efficiently determined in one view, and the operating states of the installation devices can be fairly evaluated.

In the group management method pertaining to the fifteenth aspect of the invention, the numerous installation devices installed in the plurality of buildings can be efficiently determined in one view, and the operating states of the installation devices can be fairly evaluated.

In the group management program pertaining to the sixteenth aspect of the invention, the numerous installation devices installed in the plurality of buildings can be efficiently determined in one view, and the operating states of the installation devices can be fairly evaluated.

BRIEF DESCRIPTION OF THE DRAWINGS

FIG. 10 is a diagram showing an example of a management screen of the group management apparatus pertaining to modification (2) pertaining to the embodiment.

FIG. 13 is a diagram showing examples of secondary elements of threshold values pertaining to modification (3) pertaining to the embodiment.

DESCRIPTION OF THE EMBODIMENT

Figure 1:
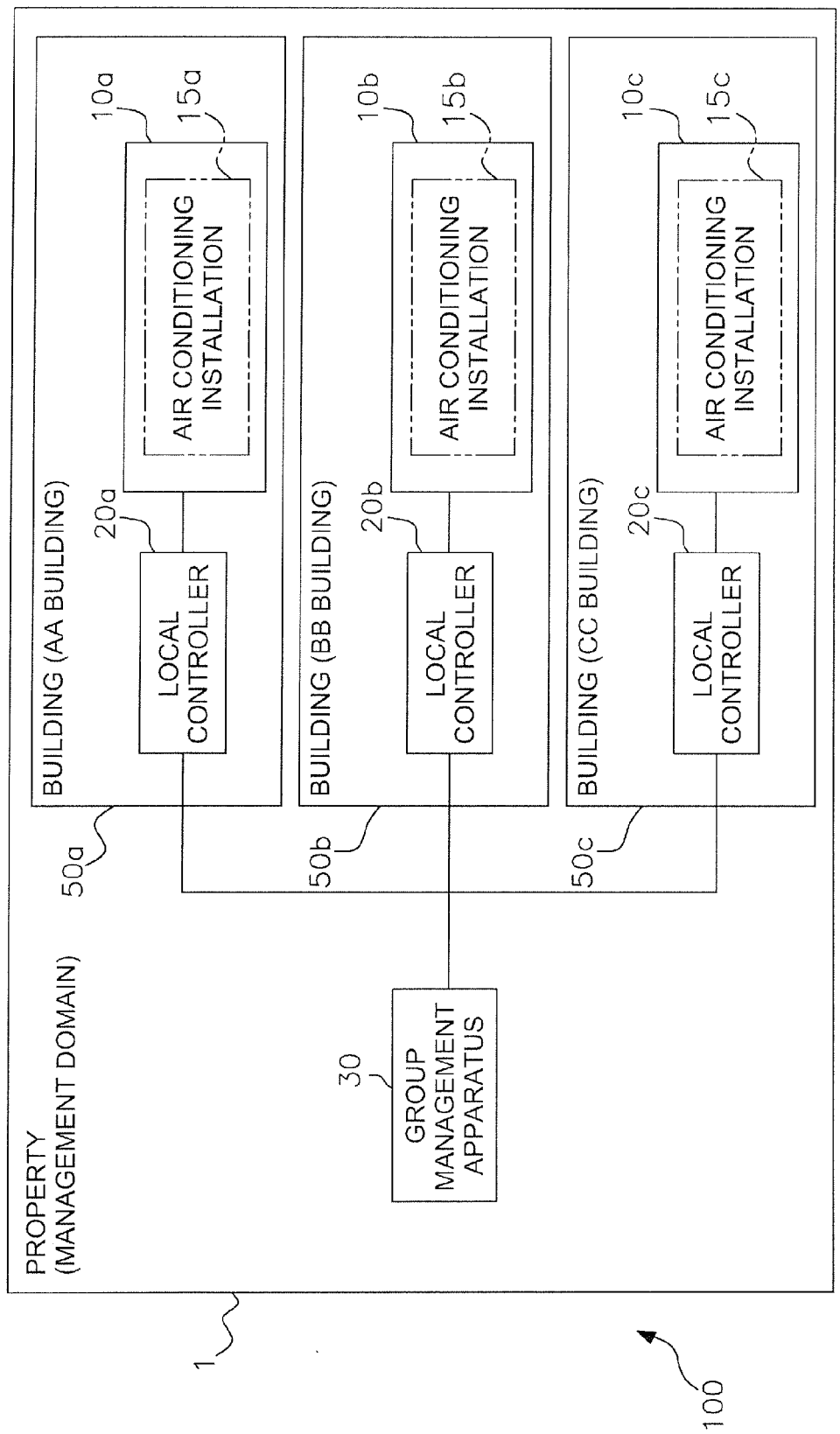
FIG. 1 is a diagram showing the overall configuration of a group management system pertaining to an embodiment.

A group management system 100 pertaining to an embodiment of the present invention will be described below on the basis of the drawings. The numbers of buildings, local controllers, and air conditioners in the group management system 100 are not limited to the numbers depicted in the drawings.
(1) Overall Configuration FIG. 1 shows the configuration of the group management system 100 of the present embodiment in a property 1. The group management system 100 is a system used in a property in which a plurality of buildings 50a, 50b, and 50c are located in a single management domain, such as a university, a hospital, or a factory. The single management domain here is a single, closed domain in which the facilities or buildings that become management targets are owned by the same or associated owners. Further, the group management system 100 is a system for managing, as several indoor unit groups 15a, 15b, and 15c, numerous indoor units (which correspond to installation devices) 12aa to 12ac, 12ba to 12bc, 12ca to 12cc, ... included in air conditioning installations 10a, 10b, and 10c inside the buildings 50a, 50b, and 50c. In the present embodiment, as shown in FIG. 1, the indoor unit groups 15a, 15b, and 15c are managed such that the numerous indoor units included in the air conditioning installation 10a inside the building 50a are managed as the indoor unit group 15a, the numerous indoor units included in the air conditioning installation 10b inside the building 50b are managed as the indoor unit group 15b, and the numerous indoor units included in the air conditioning installation 10c inside the building 50c are managed as the indoor unit group 15c.

The group management system 100 mainly includes the air conditioning installations 10a, 10b, and 10c, local controllers (which correspond to controllers) 20a, 20b, and 20c that manage the air conditioning installations 10a, 10b, and 10c, and a group management apparatus 30 that is connected to the plurality of local controllers 20a, 20b, and 20c.

Figure 2:
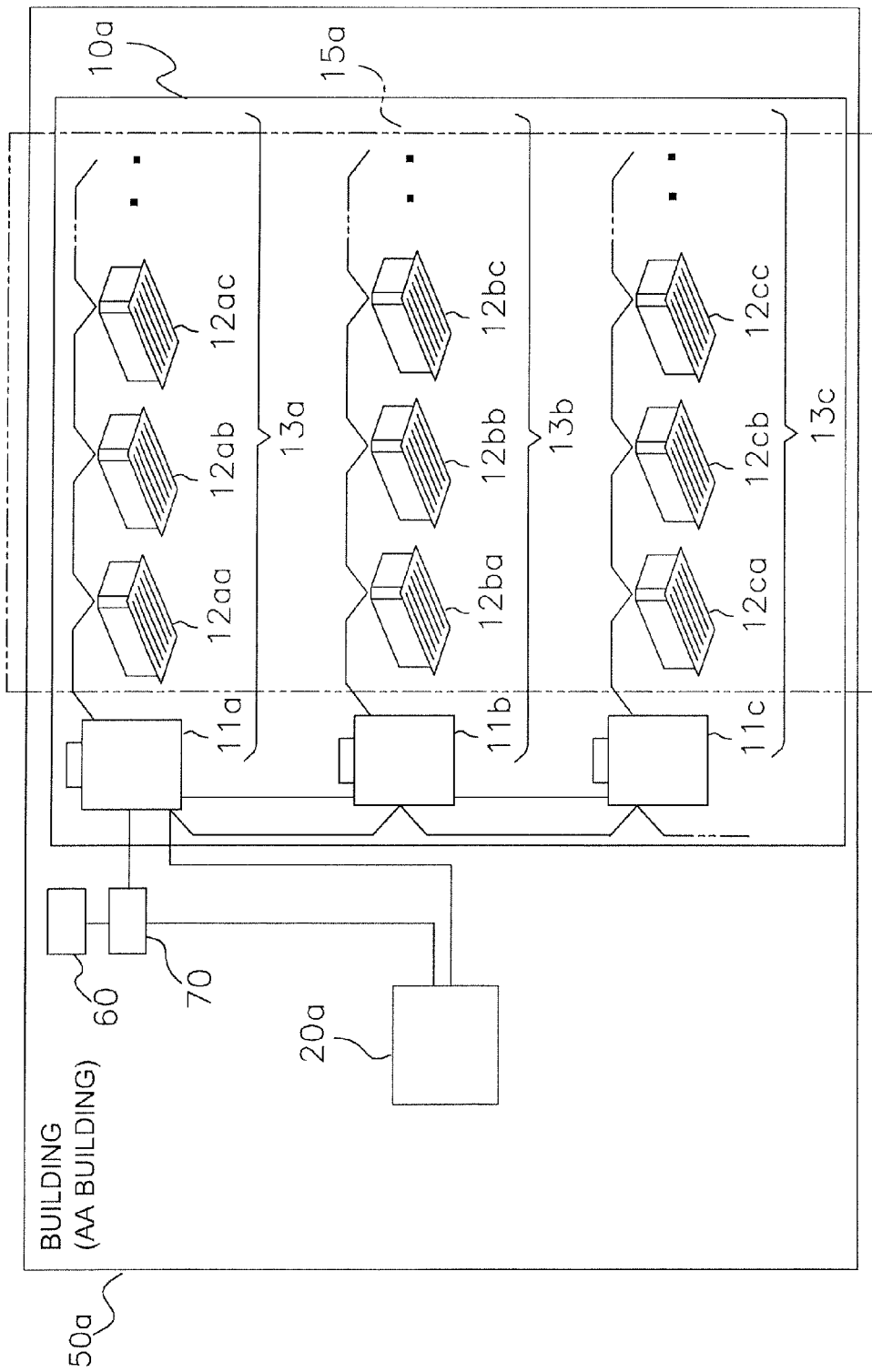
FIG. 2 is a diagram showing the configuration of air conditioners installed in a single building pertaining to the embodiment.

FIG. 2 shows the configuration inside the building 50a that includes the local controller 20a and the air conditioning installation 10a, but the other buildings 50b and 50c have the same configuration. The local controller 20a and a plurality of air conditioners 13a, 13b, and 13c serving as the air conditioning installation 10a are installed in the building 50a. The air conditioners 13a, 13b, and 13c are multi-type air conditioners and include an air conditioner 13a, which comprises an outdoor unit 11a and a plurality of indoor units 12aa, 12ab, 12ac, . . . , an air conditioner 13b, which comprises an indoor unit 11b and a plurality of indoor units 12ba, 12bb, 12bc, . . . , and an air conditioner 13c, which comprises an outdoor unit 11c and a plurality of indoor units 12ca, 12cb, 12cc, . . . . An electrical power supply 60 is connected to the outdoor units 11a, 11b, and 11c, and electrical power from the electrical power supply 60 is supplied to the air conditioners 13a, 13b, 13c, . . . via an electrical power supply line. Further, the electrical power supplied to the air conditioners 13a, 13b, 13c, . . . (total electrical energy consumption) is measured by an electrical power meter 70 disposed on the electrical power supply line interconnecting the electrical power supply 60 and the outdoor units 11a, 11b, 11c, . . . .

The group management apparatus 30 is disposed inside the management domain and is connected via an intranet line to the plurality of local controllers 20a, 20b, and 20c installed in each of the buildings 50a, 50b, and 50c.

In the group management system 100 pertaining to the present embodiment, all of the indoor units 12aa to 12ac, 12ba to 12bc, 12ca to 12cc, . . . installed inside the buildings are centrally managed using the local controllers 20a, 20b, and 20c placed in each of the buildings 50a, 50b, and 50c. Moreover, the indoor units 12aa to 12ac, 12ba to 12bc, 12ca to 12cc, . . . inside the management domain are managed as the several indoor unit groups 15a, 15b, and 15c using the group management apparatus 30 disposed inside the management domain.

(Configuration of Each Part)
(1) General Configuration of Air Conditioners

Figure 3:
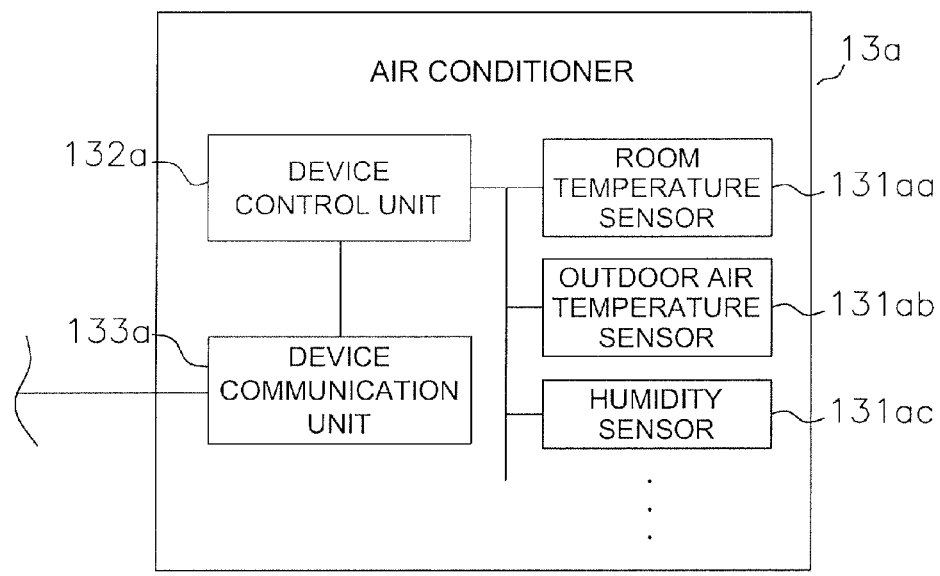
FIG. 3 is a general diagram showing the configuration of an air conditioner pertaining to the embodiment.

The air conditioners 13a, 13b, and 13c used in the present embodiment are, as described above, multi-type air conditioners. The air conditioner 13a comprising the outdoor unit 11a and the indoor unit 12aa will be described below using FIG. 3, but the air conditioner 13a comprising the outdoor unit 11a and the other indoor units 12ab, 12ac, . . . also has the same configuration. Further, the air conditioners 13b and 13e also have the same configuration.

The air conditioner 13a has a refrigerant circuit comprising a compressor and a heat exchanger that are not shown. Further, various sensors-such as a room temperature sensor 131aa, an outdoor air temperature sensor 131ab, and a humidity sensor 131ac—are attached to the air conditioner 13a. The room temperature sensor 131 as detects the temperature of the room in which the air conditioner 13a is installed. Specifically, the suction temperature of the indoor unit 12aa is detected. The outdoor air temperature sensor 131 ab detects the temperature of the outdoor air near the installation in which the air conditioner 13a is installed. The humidity sensor 131ac detects the discharge temperature that is the temperature of the refrigerant in a discharge pipe of the compressor included in the air conditioner 13a. The humidity sensor 131ac detects the humidity of the room in which the air conditioner 13a is installed.

Moreover, the air conditioner 13a has a device communication unit 133a and a device control unit 132a. The device communication unit 133a is connected by a dedicated control line to the local controller 20a. The device control unit 132a controls the operation of the air conditioner 13a in response to control commands transmitted from the outside. Further, the device control unit 132a is connected to the various sensors 131aa, 131ab, 131ac, . . . and transmits the values measured by these sensors to the local controller 20a at a predetermined interval (in the present embodiment, 1 minute).

(2) General Configuration of Local Controllers

Figure 4:
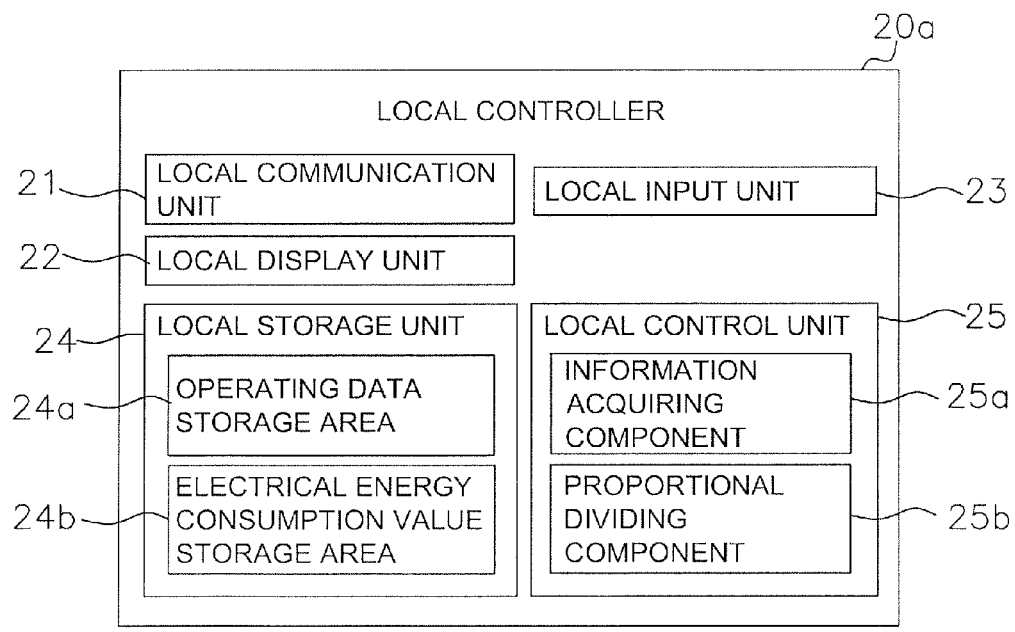
FIG. 4 is a general diagram showing the configuration of a local controller pertaining to the embodiment.

The local controllers 20a, 20b, and 20c are, as described above, placed one each in each of the buildings 50a, 50b, and 50c. The local controllers 20a, 20b, and 20c centrally manage the air conditioners 13a, 13b, 13c, . . . connected thereto. The local controllers 20a, 20b, and 20c are used by managers-in-charge who are deployed in the buildings 50a, 50b, and 50c. By using the local controllers 20a, 20b, and 20c, the managers-in-charge can perform, in one location, control such as operating and stopping, and management of the states of the numerous indoor units 12aa to 12ac, 12ba to 12bc, 12ca to 12cc, . . . installed inside the buildings 50a, 50b, and 50c. The local controller 20a will be described below using FIG. 4, but the other local controllers 20b and 20c also have the same configuration.

The local controller 20a mainly comprises a local communication unit 21, a local display unit 22, a local input unit 23, a local storage unit 24, and a local control unit 25.

The local communication unit 21 transmits signals to and receives signals from the group management apparatus 30. Further, the local communication unit 21 transmits signals to and receives signals from the indoor units 12aa to 12ac, 12ba to 12bc, 12ca to 12cc, . . . The local communication unit 21 transmits control signals to the indoor units 12aa to 12ac, 12ba to 12bc, 12ca to 12cc, . . . and receives operating data from the indoor units 12aa to 12ac, 12ba to 12bc, 12ca to 12cc, . . . . Here, the operating data are information relating to the power being on or off, the operating mode, the set temperature, the suction temperature, and the wind direction of the indoor units 12aa to 12ac, 12ba to 12bc, 12ca to 12cc, . . . . Moreover, the operating data include the values of the various sensors 131aa, 131ab, 131ac, . . . that the later-described local control unit 25 acquires by periodically connecting to the device control unit 132a. On the basis of the operating data, operating times, opening degrees of indoor expansion valves, temperature deviation values, and information that becomes indices representing comfort of each of the indoor units 12aa to 12ac, 12ba to 12bc, 12ca to 12cc, can be obtained. In the present embodiment, the operating times specifically are thermostat on-times of the indoor units 12aa to 12ac, 12ba to 12bc, 12ca to 12cc, . . . . Here, the thermostat on-times are times when the indoor units 12aa to 12ac, 12ba to 12bc, 12ca to 12cc, . . . are performing cold/hot heat supply.

Figure 5:
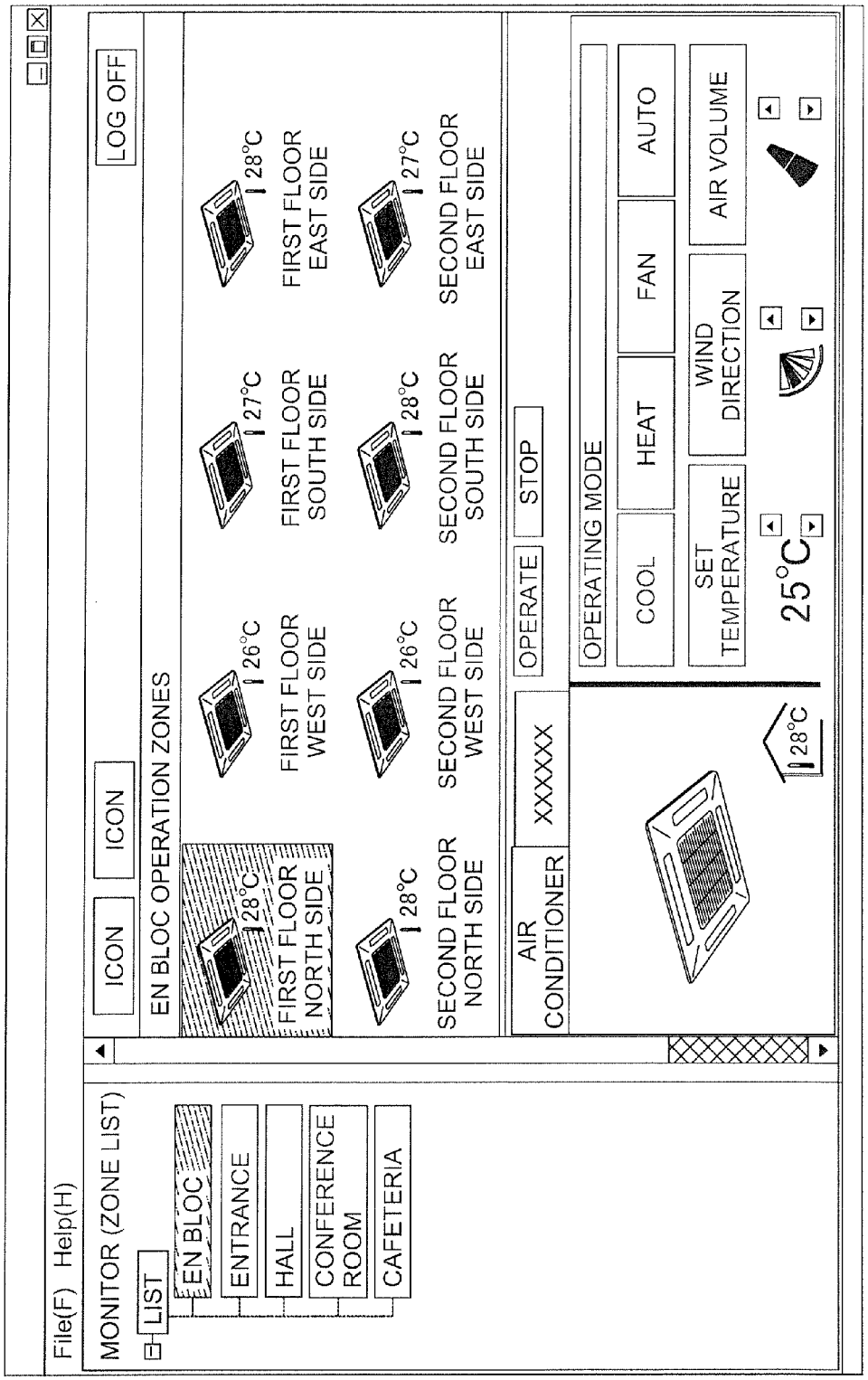
FIG. 5 is a diagram showing an example of a management screen of the local controller pertaining to the embodiment.

The local display unit 22 is a display on which a management screen (see FIG. 5) is displayed when a later-described management program has been executed. The management screen is a screen that displays the operating data of the indoor units 12*aa* to 12*ac*, 12*ba* to 12*bc*, 12*ca* to 12*cc*, . . . that have been received by the local controller 20*a*. Further, the management screen is also an operation screen for receiving control commands with respect to the plurality of indoor units 12*aa* to 12*ac*, 12*ba* to 12*bc*, and 12*ca* to 12*cc*.

The local input unit 23 mainly includes a touch panel and operation buttons that cover the display.

The local storage unit 24 mainly has an operating data storage area 24*a* and an electrical energy consumption value storage area 24*b*. The operating data storage area 24*a* stores operating data that have been acquired by a later-described information acquiring component 25*a*. The electrical energy consumption value storage area 24*b* stores information relating to electrical energy consumption. The information relating to electrical energy consumption specifically are a value (a total electrical energy consumption value) relating to the total electrical energy consumption of the air conditioners 13*a*, 13*b*, 13*c*, . . . as measured by the electrical power meter 70 and values (electrical energy consumption values) relating to the electrical energy consumption of each of the indoor units 12*aa* to 12*ac*, 12*ba* to 12*bc*, 12*ca* to 12*cc*, . . . as calculated by a later-described proportional dividing component 25*b*. The local storage unit 24 has, in addition to the above-described areas, an area in which is stored a management program that the later-described local control unit 25 can read and execute.

The local control unit 25 executes the management program stored in the local storage unit 24 and centrally manages the indoor units 12*aa* to 12*ac*, 12*ba* to 12*bc*, 12*ca* to 12*cc*, The local control unit 25 mainly has an information acquiring component 25*a* and a proportional dividing component 25*b*. The information acquiring component 25*a* periodically connects to the device control units 132*a* included in the air conditioners 13*a*, 13*b*, 13*c*, . . . and acquires the operating data of the indoor units 12*aa* to 12*ac*, 12*ba* to 12*bc*, 12*ca* to 12*cc*, . . . . Further, the information acquiring component 25*a* acquires the information relating to the total electrical energy consumption value measured by the power meter 70. The proportional dividing component 25*b* proportionally divides the total electrical energy consumption value of the air conditioners 13*a*, 13*b*, 13*c*, . . . stored in the electrical energy consumption value storage area 24*b*, according to the operating data stored in the operating data storage area 24*a*, and calculate the electrical energy consumption values of each of the indoor units 12*aa* to 12*ac*, 12*ba* to 12*bc*, 12*ca* to 12*cc*, . . . . Specifically, as described in JP-A No. 5-157336, the total electrical energy consumption value is proportionally divided according to information such as the opening degrees of the expansion valves of each of the indoor units 12*aa* to 12*ac*. 12*ba* to 12*bc*, 12*ca* to 12*cc*, . . . so that the electrical energy consumption values of each of the indoor units 12*aa* to 12*ac*, 12*ba* to 12*bc*, 12*ca* to 12*cc*, are calculated. The electrical energy consumption values that have been calculated by the proportional dividing component 25*b* are stored in the electrical energy consumption value storage area 24*b*.

Moreover, the local control unit 25 causes the local display unit 22 to display the operating states of the indoor units 12*aa* to 12*ac*, 12*ba* to 12*bc*, 12*ca* to 12*cc*, . . . (e.g., whether the indoor units are in an operating or stopped state, the room temperature, the operating mode, the wind direction, the air volume, whether or not there is an abnormality, etc.) on the basis of the acquired operating data. Moreover, the local control unit 25 performs control of the plurality of indoor units 12*aa* to 12*ac*, 12*ba* to 12*bc*, 12*ca* to 12*cc*, . . . (changes the operating or stopped state, changes the operating mode such as a cooling mode, a heating mode, and a fan mode, changes the temperature, changes the wind direction, changes the air volume, etc.) on the basis of control commands that have been received by the local display unit 22.

(3) General Configuration of Group Management Apparatus 30

One group management apparatus 30 is installed in a location where a system manager stands by inside the management domain. Here, the system manager is a manager who manages the group management system 100 overall. The group management apparatus 30 is connected to all of the local controllers 20*a*, 20*b*, and 20*c* inside the management domain and centrally manages, as the several indoor unit groups 15*a*, 15*b*, and 15*c*, all of the indoor units 12*aa* to 12*ac*, 12*ba* to 12*bc*, 12*ca* to 12*cc*, . . . inside the management domain. The indoor units 12*aa* to 12*ac*, 12*ba* to 12*bc*, 12*ca* to 12*cc*, . . . are classified into the indoor unit groups 15*a*, 15*b*, and 15*c* on the basis of later-described classification information, and in the present embodiment, as described above, the indoor units 12*aa* to 12*ac*, 12*ba* to 12*bc*, 12*ca* to 12*cc*, . . . installed in the same buildings 50*a*, 50*b*, and 50*c* are classified into single groups.

Figure 6:
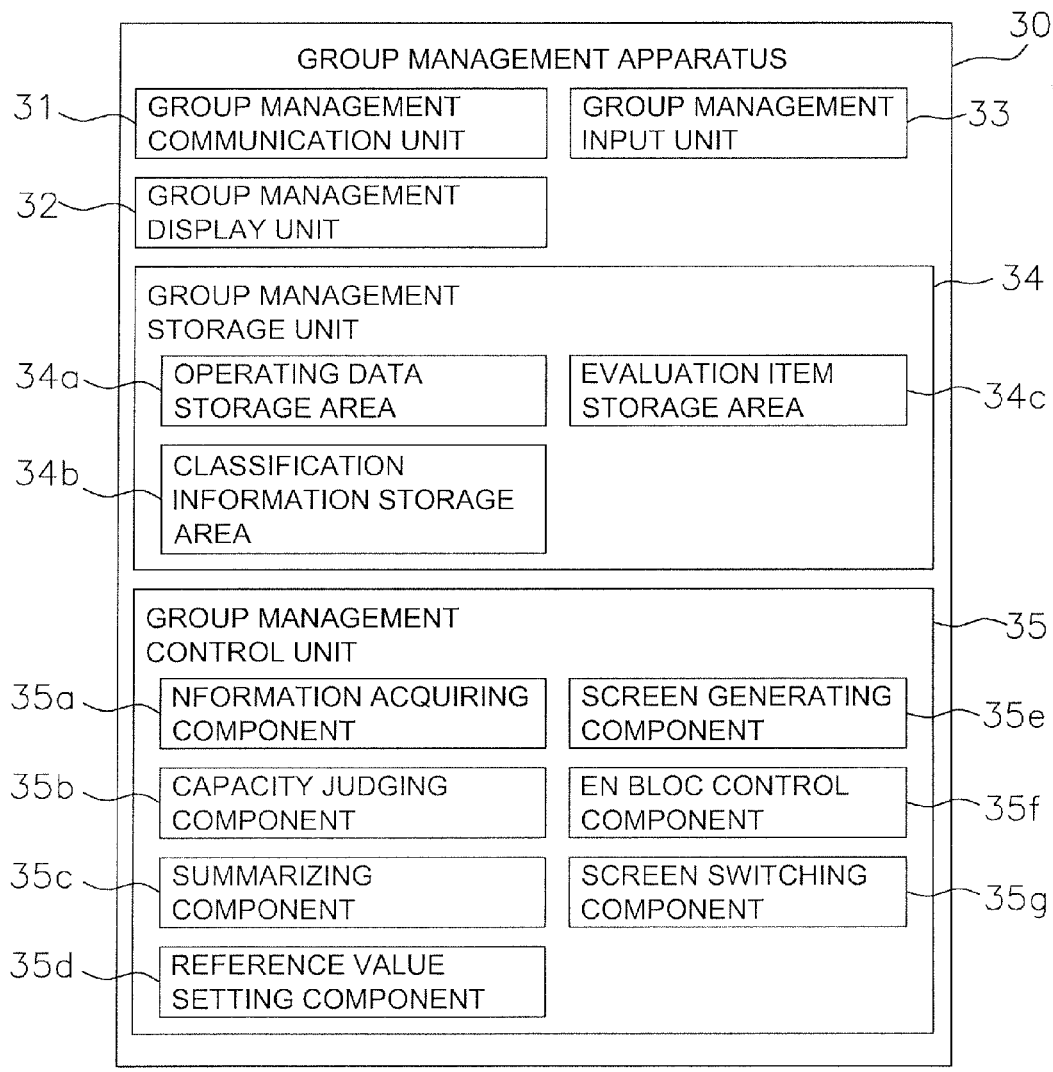
FIG. 6 is a general diagram showing the configuration of a group management apparatus pertaining to the embodiment.

As shown in FIG. 6, the group management apparatus 30 mainly comprises a group management communication unit 31, a group management display unit 32, a group management input unit 33, a group management storage unit 34, and a group management control unit 35.

The group management communication unit 31 is connected to the local communication units 21 via an intranet line and transmits signals to and receives signals from the local controllers 20*a*, 20*b*, and 20*c*.

The group management display unit 32 is a display for displaying results obtained by executing a later-described group management program (see FIG. 7). The group management display unit 32 displays states of the indoor unit groups 15*a*, 15*b*, and 15*c* relating to all of the indoor units 12*aa* to 12*ac*, 12*ba* to 12*bc*, 12*ca* to 12*cc*, . . . placed in all of the buildings 50*a*, 50*b*, and 50*c* inside the management domain. Further, the group management display unit 32 is also an operation screen for receiving control commands from the system manager with respect to the indoor unit groups 15*a*, 15*b*, and 15*c*.

Figure 7:
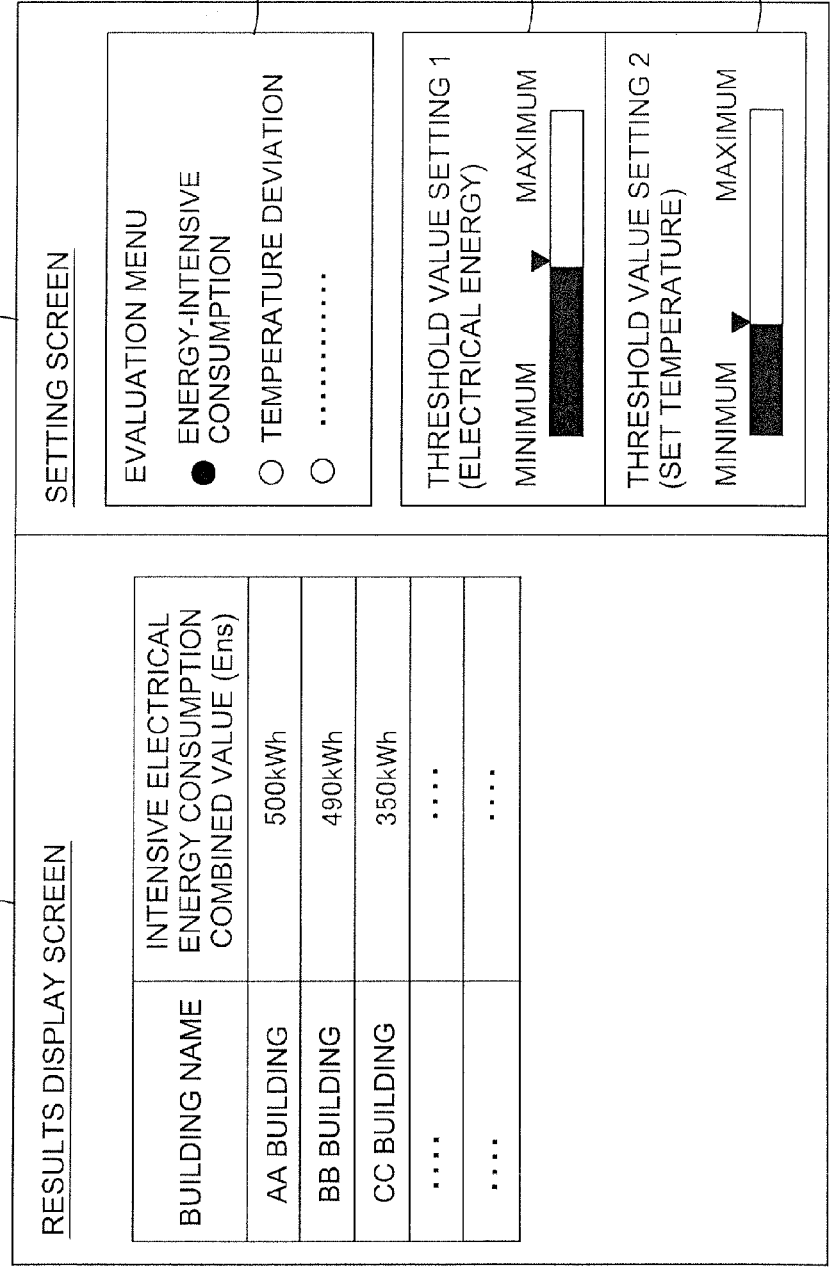
FIG. 7 is a diagram showing an example of a management screen of the group management apparatus pertaining to the embodiment.
Figure 8:
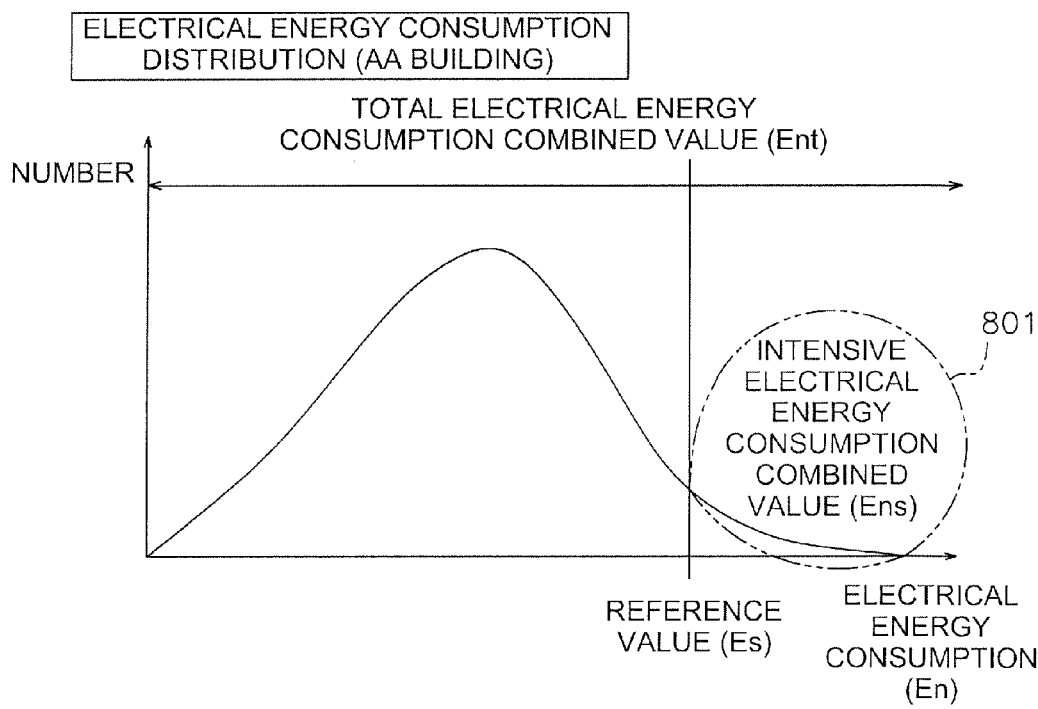
FIG. 8 is a diagram showing an example of a distribution of electrical energy consumption values of an indoor unit group pertaining to the embodiment.

As shown in FIG. 7, the display of the group management apparatus 30 includes a setting screen 70 and a results display screen 71. The setting screen 70 includes an evaluation menu 70*a* and threshold value setting areas 70*ba* and 70*bb*. The evaluation menu 70*a* is for selecting items for evaluating the states of the indoor unit groups 15*a*, 15*b*, and 15*c*. The threshold value setting areas 70*ba* and 70*bb* are for setting threshold values serving as an evaluation reference value Es. The evaluation menu 70*a* includes numerous items, such as, for example, an energy-intensive consumption item and a temperature deviation item. The energy-intensive consumption item is for evaluating the indoor unit groups 15*a*, 15*b*, and 15*c* whose electrical energy consumption value is high. The temperature deviation item is for evaluating the indoor unit groups 15*a*, 15*b*, and 15*c* where the extent of temperature deviation between the suction temperature value and the set temperature value is large. The threshold value setting areas 70*ba* and 70*bb* include an area 70*ba* for setting a threshold value relating to electrical energy and an area 70*bb* for setting a threshold value relating to set temperature. The results display screen 71 displays combined values Ens of state values equal to or greater than the reference value Es in each of the buildings 50*a*, 50*b*, and 50*c* (see reference sign 801 in FIG. 8). Here, the state values are values representing the operating states of the indoor units 12*aa* to 12*ac*, 12*ba* to 12*bc*, 12*ca* to 12*cc*, . . . and differ depending on the selected evaluation item. For example, when an evaluation with respect to energy-intensive consumption is performed, the state values are the electrical energy consumption values, and when an evaluation with respect to temperature deviation is performed, the state values are the differences between the set temperature and the suction temperature. In FIG. 7, the energy-intensive consumption item is selected. Further, in the results display screen 71, building names and their corresponding intensive electrical energy consumption combined values Ens are listed in a table in descending order of the combined values Ens of electrical energy consumption values equal to or greater than the reference value Es.

Moreover, the group management display unit 32 has an group setting area, which is not illustrated, for performing setting of the classes of the indoor units 12aa to 12ac, 12ba to 12bc, 12ca to 12cc, . . . . The content that has been set here is stored in a later-described classification information storage area 34b.

The group management input unit 33 mainly comprises a touch panel covering the display and operation buttons.

The group management storage unit 34 has an area that stores a group management program for centrally managing, as the several indoor unit groups 15a, 15b, and 15c, the indoor units 12aa to 12ac, 12ba to 12bc, 12ca to 12cc, . . . managed by the controllers 20a, 20b, and 20c. Further, the group management storage unit 34 includes an operating data storage area 34a, a classification information storage area 34b, and an evaluation item storage area 34c. The operating data storage area 34a accumulates operating data relating to the indoor units 12aa to 12ac, 12ba to 12bc, 12ca to 12cc, . . . that have been acquired from the local controllers 20a, 20b, and 20c by a later-described information acquiring component 35a. Here, the operating data include the information described above relating to the power being on or off, the operating mode, the set temperature, the suction temperature, and the wind direction of the indoor units 12aa to 12ac, 12ba to 12bc, 12ca to 12cc, . . . , the values of the various sensors 131aa, 131ab, 131ac, . . . , and also the electrical energy consumption values that have been proportionally divided by the proportional dividing components 25b of the local controllers 20a, 20b, and 20c. Moreover, the operating data storage area 34a stores correction values of the electrical energy consumption values as calculated by a later-described capacity judging component 35b. The classification information storage area 34b stores information (classification information) for classifying the indoor units 12aa to 12ac, 12ba to 12bc, 12ca to 12cc, . . . into the several indoor unit groups 15a, 15b, and 15c. The classification information is information for classifying the indoor units 12aa to 12ac, 12ba to 12bc, 12ca to 12cc, . . . into the indoor unit groups 15a, 15b, and 15c on the basis of physical conditions, temporal conditions, etc. The physical conditions include the types and orientations of the buildings in which the indoor units 12aa to 12ac, 12ba to 12bc, 12ca to 12cc, . . . are installed. In the present embodiment, as described above, the indoor units 12aa to 12ac, 12ba to 12bc, 12ca to 12cc, . . . installed in each of the buildings 50a, 50b, and 50c are classified into the indoor unit groups 15a, 15b, and 15c. Specifically, in the present embodiment, all of the indoor units 12aa to 12ac, 12ba to 12bc, 12ca to 12cc, . . . inside the management domain are classified into the indoor unit group 15a of AA building, the indoor unit group 15b of BB building, and the indoor unit group 15c of CC building according to the buildings 50a, 50b, and 50c in which the indoor units are installed. The information stored in the classification information storage area 34b can be set in the group setting area which is not illustrated. The evaluation item storage area 34c stores items used when performing an evaluation of the indoor unit groups 15a, 15b, and 15c. Specifically, these items correspond to the items listed in the evaluation menu 70a shown in FIG. 7.

The group management control unit 35 executes the group management program stored in the group management storage unit 34 to determine the operating states of the indoor unit groups 15a, 15b, and 15c. The group management control unit 35 mainly includes an information acquiring component 35a, a capacity judging component 35b, a summarizing component 35c, a reference value setting component 35d, a screen generating component 35e, an en bloc control component 35f, and a screen switching component 35g.

The information acquiring component 35a acquires, as operating data from each of the local controllers 20a, 20b, and 20c, the operating data stored in the operating data storage areas 24a and the electrical energy consumption values of each of the indoor units 12aa to 12ac, 12ba to 12bc, 12ca to 12cc, . . . stored in the electrical energy consumption value storage areas 24b. The acquired operating data are stored in the operating data storage area 34a.

The capacity judging component 35b judges, in consideration of the air conditioning capacities of the indoor units 12aa to 12ac, 12ba to 12bc, 12ca to 12cc, . . . , the electrical energy consumption values of each of the indoor units 12aa to 12ac, 12ba to 12bc, 12ca to 12cc, . . . stored in the operating data storage area 34a. Specifically, the capacity judging component 35b calculates values (correction values) En obtained by dividing the electrical energy consumption values of each of the indoor units 12aa to 12ac, 12ba to 12bc, 12ca to 12cc, . . . by the air conditioning capacities. Here, the air conditioning capacities are the horsepower or capacities kW of the indoor units 12aa to 12ac, 12ba to 12bc, 12ca to 12cc, The correction values En that have been calculated by the capacity judging component 35b are stored in the operating data storage area 34a.

The summarizing component 35c performs first processing to third processing. In the first processing, the summarizing component 35c classifies the indoor units 12aa to 12ac, 12ba to 12bc, 12ca to 12cc, . . . into each of the indoor unit groups 15a, 15b, and 15c on the basis of the information stored in the classification information storage area 34b. In the second processing, the summarizing component 35c compares, with the predetermined reference value Es, the state values of the indoor units 12aa to 12ac, 12ba to 12bc, 12ca to 12cc, . . . that have been classified into each of the indoor unit groups 15a, 15b, and 15c to calculate the combined values Ens of state values equal to or greater than the predetermined reference value Es (see reference sign 801 in FIG. 8). That is, the summarizing component 35c calculates, in terms of the indoor unit groups 15a, 15b, and 15c, the extent of state values equal to or greater than the reference value Es. Here, the predetermined reference value Es is a threshold value that has been set by the later-described reference value setting component 35d on the basis of the content that has been set in the threshold value setting areas 70ba and 70bb of the setting screen 70. Moreover, in the third processing, the summarizing component 35c compares the combined values Ens of state values equal to or greater than the reference value Es of each of the indoor unit groups 15a, 15b, and 15c to decide magnitude relations of the combined values Ens of each of the indoor unit groups 15a, 15b, and 15c. When an evaluation with respect to energy-intensive consumption is performed, the electrical energy consumption values compared with the reference value Es are the correction values En where the air conditioning capacities have been considered by the capacity judging component 35b.

The reference value setting component 35d sets a threshold value (the reference value Es) on the basis of the content that has been set in the threshold value setting areas 70ba and 70bb of the setting screen 70.

The screen generating component 35e generates a screen for displaying on the group management display unit 32 the results that have been processed by the summarizing component 35c.

The en bloc control component 35f generates a command requesting all of the local controllers 20a, 20b, and 20c connected to the group management apparatus 30 to perform control to operate en bloc or stop en bloc the indoor units 12aa to 12ac, 12ba to 12bc, 12ca to 12cc, . . . to which they are connected.

The screen switching component 35g switches the screen displayed on the group management display unit 32 to different screens. The different screens are the management screens displayed by the local display units 22 (see FIG. 5). The results that have been obtained by executing the group management program (see FIG. 7) are displayed on the group management display unit 32, but when any of the indoor unit groups 15a, 15b, and 15c displayed as those results is selected in a predetermined portion of the display, the management screen displayed on the local controller 20a, 20b, or 20c connected to the selected indoor unit group 15a, 15b, or 15c is displayed on the group management display unit 32. Here, the management screen of the management program that is displayed as a result of the management program having been executed is displayed on the group management display unit 32 of the group management apparatus 30 using a Web browser.

(4) Flow of Processing

Figure 9A:
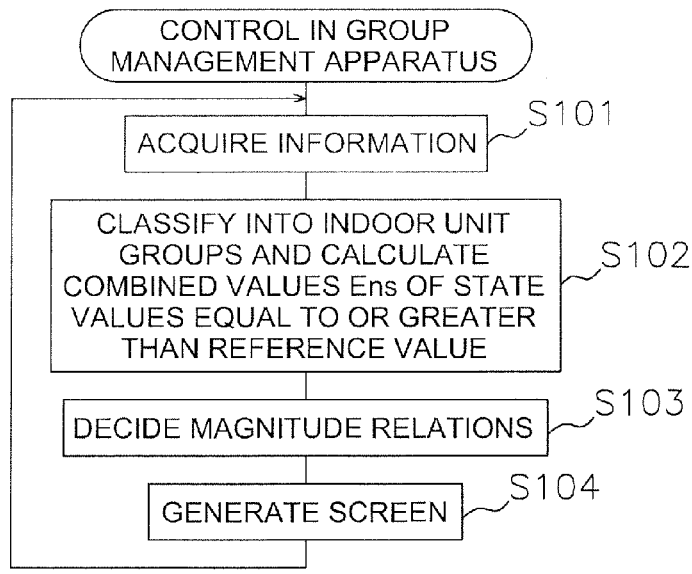
FIG. 9A is a flowchart showing a flow of processing of the group management apparatus pertaining to the embodiment.

A flow of processing in the group management apparatus 30 will be described below using FIG. 9A. First, in step S101, the information acquiring component 35a acquires information (e.g., the operating data) relating to each of the indoor units 12aa to 12ac, 12ba to 12bc, 12ca to 12cc, . . . from each of the local controllers 20a, 20b, and 20c. Then, in step S102, the indoor units 12aa to 12ac, 12ba to 12bc, 12ca to 12cc, . . . are classified into each of the indoor unit groups 15a, 15b, and 15c by the summarizing component 35c. Moreover, the combined, values Ens of state values equal to or greater than the predetermined reference value Es of the state values of the indoor units 12aa to 12ac, 12ba to 12bc, 12ca to 12cc, belonging to each of the indoor unit groups 15a, 15b, and 15c are calculated. Then, in step S103, the magnitude relations of the combined values Ens of each of the indoor unit groups 15a, 15b, and 15c are decided, and the flow advances to step S104. In step S104, the screen to be displayed on the display is generated.

Figure 9B:
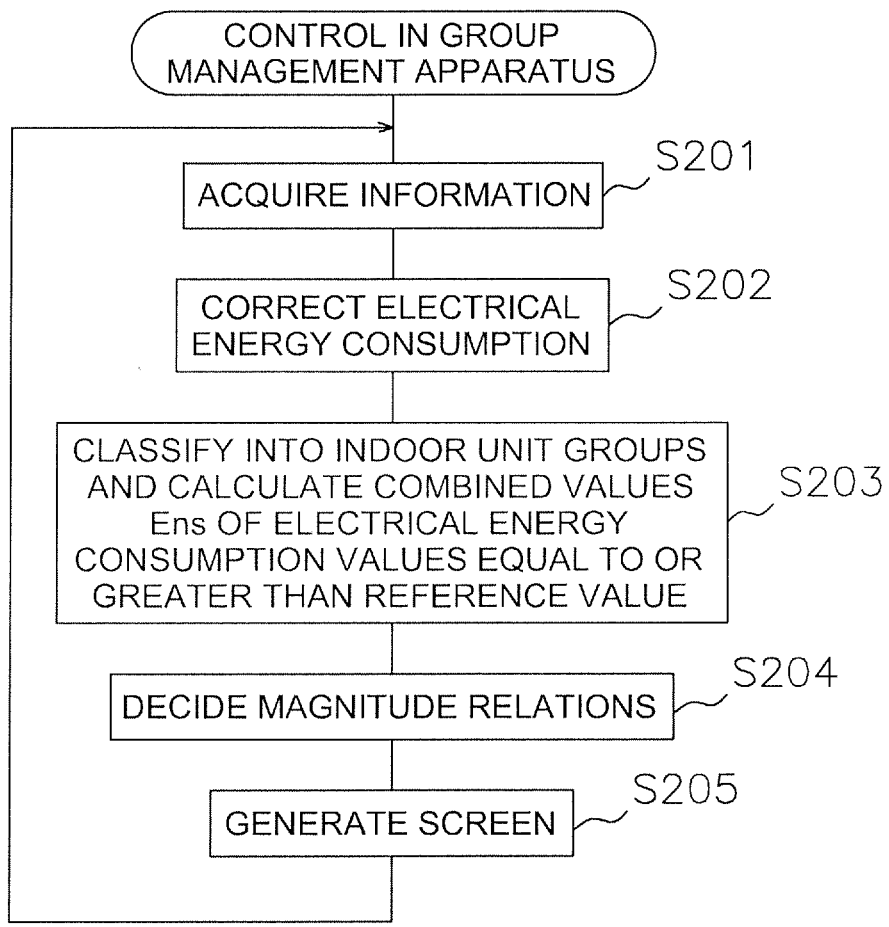
FIG. 9B is a flowchart showing a flow of processing of the group management apparatus pertaining to the embodiment.

Further, when energy-intensive consumption has been selected in the evaluation menu 70a, processing shown in FIG. 9B is performed. First, in step S201, the information acquiring component 35a acquires information (e.g., the operating data and the electrical energy consumption values) relating to each of the indoor units 12aa to 12ac, 12ba to 12bc, 12ca to 12cc, . . . from each of the controllers 20a, 20b, and 20c. Then, the flow advances to step S202 where the correction values En of the electrical energy consumption values are calculated by the capacity judging component 35b. That is, the values obtained by dividing the electrical energy consumption values by the air conditioning capacities of the indoor units 12aa to 12ac, 12ba to 12bc, 12ca to 12cc, . . . are calculated. Then, in step S203, the indoor units 12aa to 12ac, 12ba to 12bc, 12ca to 12cc, . . . are classified into each of the indoor unit groups 15a, 15b, and 15c by the summarizing component 35c. Moreover, among the correction values En of the electrical energy consumption values of the indoor units 12aa to 12ac, 12ba to 12bc, 12ca to 12cc, . . . belonging to each of the indoor unit groups 15a, 15b, and 15c, the combined values Ens of electrical energy consumption values equal to or greater than the predetermined reference value Es (reference sign 801 in FIG. 8) are calculated. Then, in step S204, the magnitude relations of the combined values Ens of each of the indoor unit groups 15a, 15b, and 15c are decided, and the flow advances to step S205. In step S205, the screen to be displayed on the display is generated.

<Characteristics>

(1) The group management apparatus 30 pertaining to the present embodiment classifies, into the several indoor unit groups 15a, 15b, and 15c, the numerous indoor units 12aa to 12ac, 12ba to 12bc, 12ca to 12cc, . . . installed in each of the buildings 50a, 50b, and 50c in the management domain such as a university, a hospital, or a factory having the plurality of buildings 50a, 50b, and 50c, and the group management apparatus 30 comparably displays the states of each of the indoor unit groups 15a, 15b, and 15c. Thus, the single system manager who manages the system overall can determine, in one view, the operating states of the numerous indoor units 12aa to 12ac, 12ba to 12bc, 12ca to 12cc, . . . installed in each of the buildings 50a, 50b, and 50c. Thus, efficiency improves per installation device management. Moreover, the operating states of the numerous indoor units 12aa to 12ac, 12ba to 12bc, 12ca to 12cc, . . . can be fairly evaluated.

The local controller 20a can be wired only to the indoor units 12aa to 12ac, 12ba to 12bc, 12ca to 12cc, . . . installed in the single building 50a, so in a property in which the plurality of buildings 50a, 50b, and 50c are located, the plurality of local controllers 20a, 20b, and 20c are installed in the single management domain. The local controllers 20a, 20b, and 20c are operated by the managers-in-charge who are deployed in each of the buildings 50a, 50b, and 50c, and energy conservation and temperature deviation measures are taken. However, the measures taken in the indoor units 12aa to 12ac, 12ba to 12bc, 12ca to 12cc, are taken on the basis of evaluations of the managers-in-charge, so when evaluations are performed by several managers-in-charge, bias can arise in the extent of the measures depending on the manager-in-charge. By using the group management apparatus 30 pertaining to the present embodiment, the system manager can comprehensively determine the operating states of all of the indoor units 12aa to 12ac, 12ba to 12bc, 12ca to 12cc, placed in the system overall, so necessary measures can be taken on the basis of a fair evaluation by the system manager.

(2) Further, when the single system manager manages at once the operating states of the numerous indoor units 12aa to 12ac, 12ba to 12bc, 12ca to 12cc, . . . , the work of checking one by one the operating states of each of the indoor units 12aa to 12ac, 12ba to 12bc, 12ca to 12cc, . . . requires an enormous amount of time and effort. However, the group management apparatus 30 pertaining to the present embodiment manages the indoor units 12aa to 12ac, 12ba to 12bc, 12ca to 12cc, . . . as the indoor unit groups 15a, 15b, and 15c. Further, the group management apparatus 30 compares, with the reference value Es, the state values of the indoor units 12aa to 12ac, 12ba to 12bc, 12ca to 12cc, . . . included in the indoor unit groups 15a, 15b, and 15c to determine the operating states of the indoor units groups 15a, 15b, and 15c. Moreover, the group management apparatus 30 displays the states of single indoor unit groups such that they can be compared with the states of other indoor unit groups. Thus, the system manager can more easily judge whether a measure should be taken with respect to any of the indoor unit groups 15a, 15b, and 15c.

Further, any irregularity occurring in the states of the indoor unit groups 15a, 15b, and 15c can be normalized, so, for example, not only an indoor unit group where energy conservation is needed but also a drop in comfort resulting from immoderate energy conservation can be considered.

(3) Moreover, the group management apparatus 30 pertaining to the present embodiment can select the evaluation items from among plural items. Thus, the states of the indoor unit groups 15a, 15b, and 15c can be managed from several angles.

(4) The group management apparatus 30 pertaining to the present embodiment can classify the indoor units 12aa to 12ac, 12ba to 12bc, 12ca to 12cc, . . . into the desired indoor unit groups 15a, 15b, and 15c. In the present embodiment, the group management apparatus 30 classified the indoor units 12aa to 12ac, 12ba to 12bc, 12ca to 12cc, . . . installed in each of the buildings 50a, 50b, and 50c into single indoor unit groups, but the group management apparatus 30 can also classify the indoor units 12aa to 12ac, 12ba to 12bc, 12ca to 12cc, . . . on the basis of, for example, physical conditions including the types and orientations of the buildings in which the indoor units 12aa to 12ac, 12ba to 12bc, 12ca to 12cc, . . . are installed, temporal conditions, etc. Thus, management of the indoor units 12aa, 12ab, 12ac, 12ad, . . . can be performed in consideration of the characteristics of the indoor unit groups.

(5) Further, in the group management apparatus 30 pertaining to the present embodiment, the management screens displayed by the local controllers 20a, 20b, and 20c can be perused and operated via an intranet. Thus, the specific operating states of the indoor units 12aa to 12ac, 12ba to 12bc, 12ca to 12cc, . . . included in the indoor unit groups 15a, 15b, and 15c can be easily checked, and also necessary setting changes and the like can be made.

<Modifications>

(1) In the above-described embodiment, the group management apparatus 30 performed an evaluation on the basis of the combined values Ens of state values of the indoor units 12aa to 12ac, 12ba to 12bc, 12ca to 12cc, . . . equal to or greater than the reference value Es, but the group management apparatus 30 may also perform an evaluation on the basis of the combined values Ens of state values of the indoor units 12aa to 12ac, 12ba to 12bc, 12ca to 12cc, . . . equal to or less than the reference value Es. Thus, for example, indoor unit groups having many of the indoor units 12aa to 12ac, 12ba to 12bc, 12ca to 12cc, . . . with good energy conservation rates can be easily identified, and the measures being taken in those indoor unit groups 15a, 15b, and 15c can be applied to other indoor unit groups.

Figure 10:
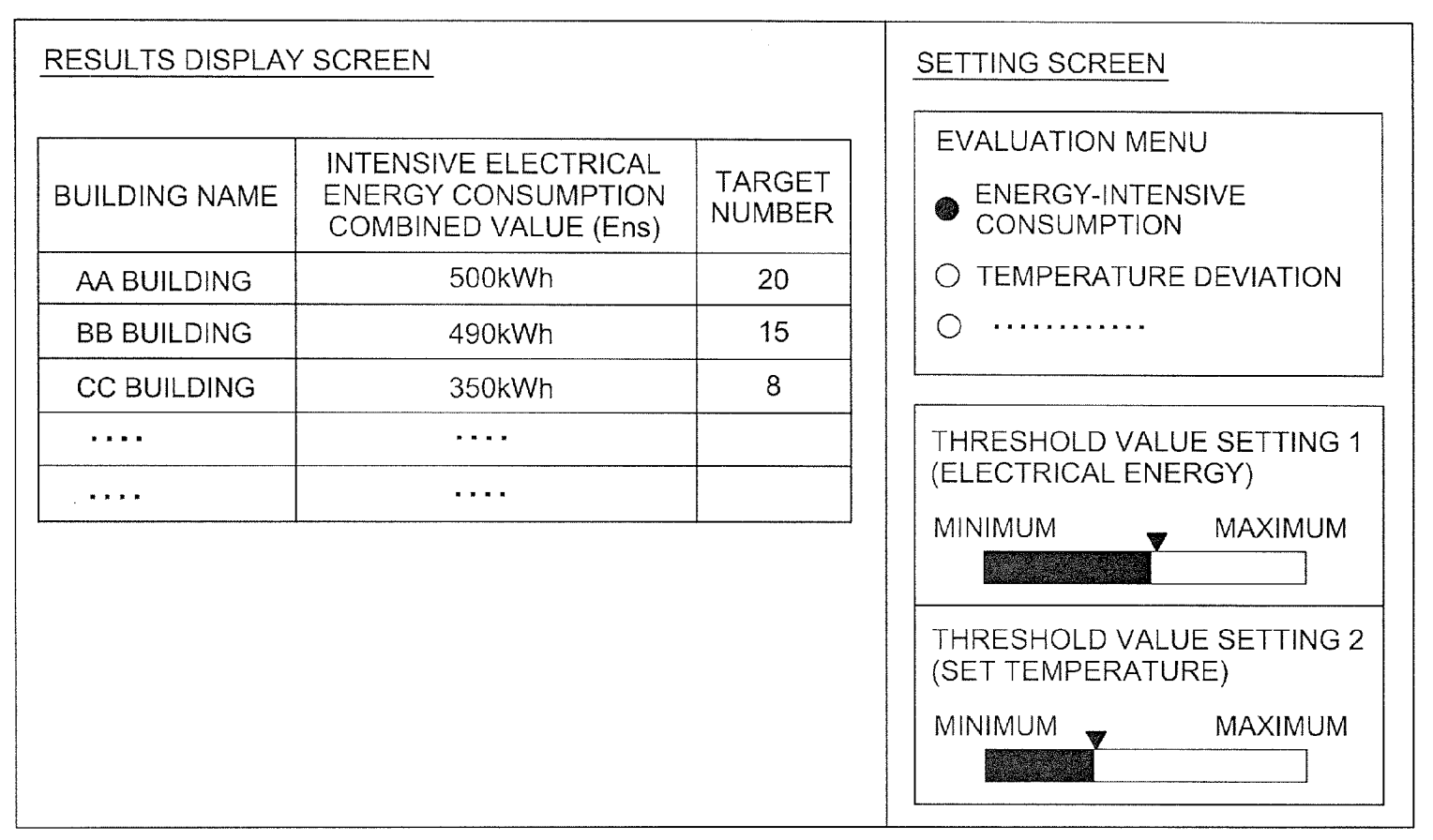

(2) In the above-described embodiment, in the results display screen 71 of FIG. 7, the specific combined values Ens and the building names (AA building, BB building, CC building) were listed in a table in descending order of the combined values Ens such that the magnitude relations of the combined values Ens of the state values of each of the indoor unit groups 15a, 15b, and 15c can be easily discriminated, but as shown in FIG. 10, the numbers of the indoor units 12aa to 12ac, 12ba to 12bc, 12ca to 12cc, . . . having state values equal to or greater than the reference value Es may also be listed. Thus, the per-unit effect that is obtained by taking a measure can be determineed.

Figure 11:
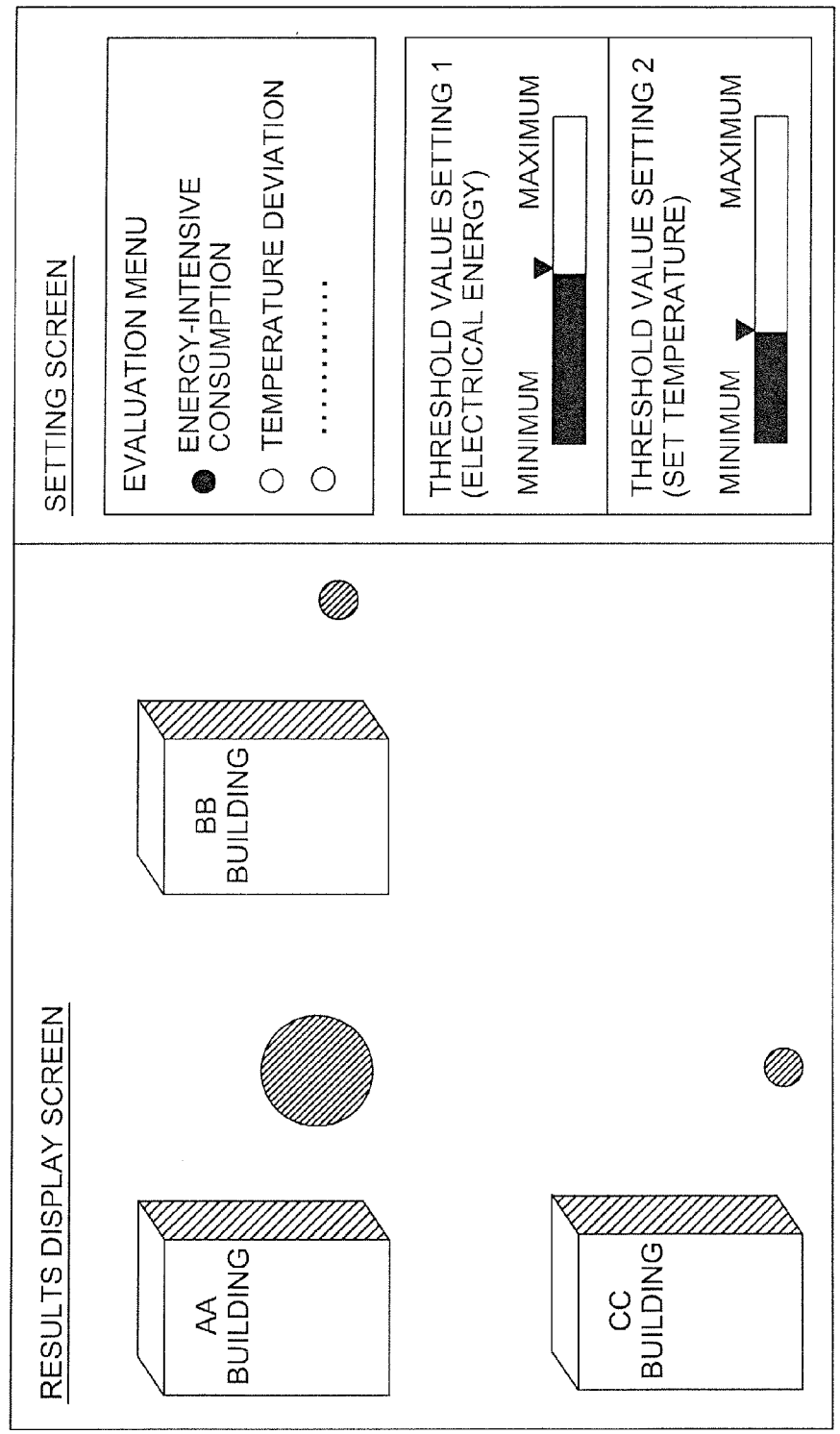
FIG. 11 is an exemplification of threshold values used as a predetermined reference value pertaining to modification (2) pertaining to the embodiment and secondary elements that can be considered together with the threshold values.
Figure 12:
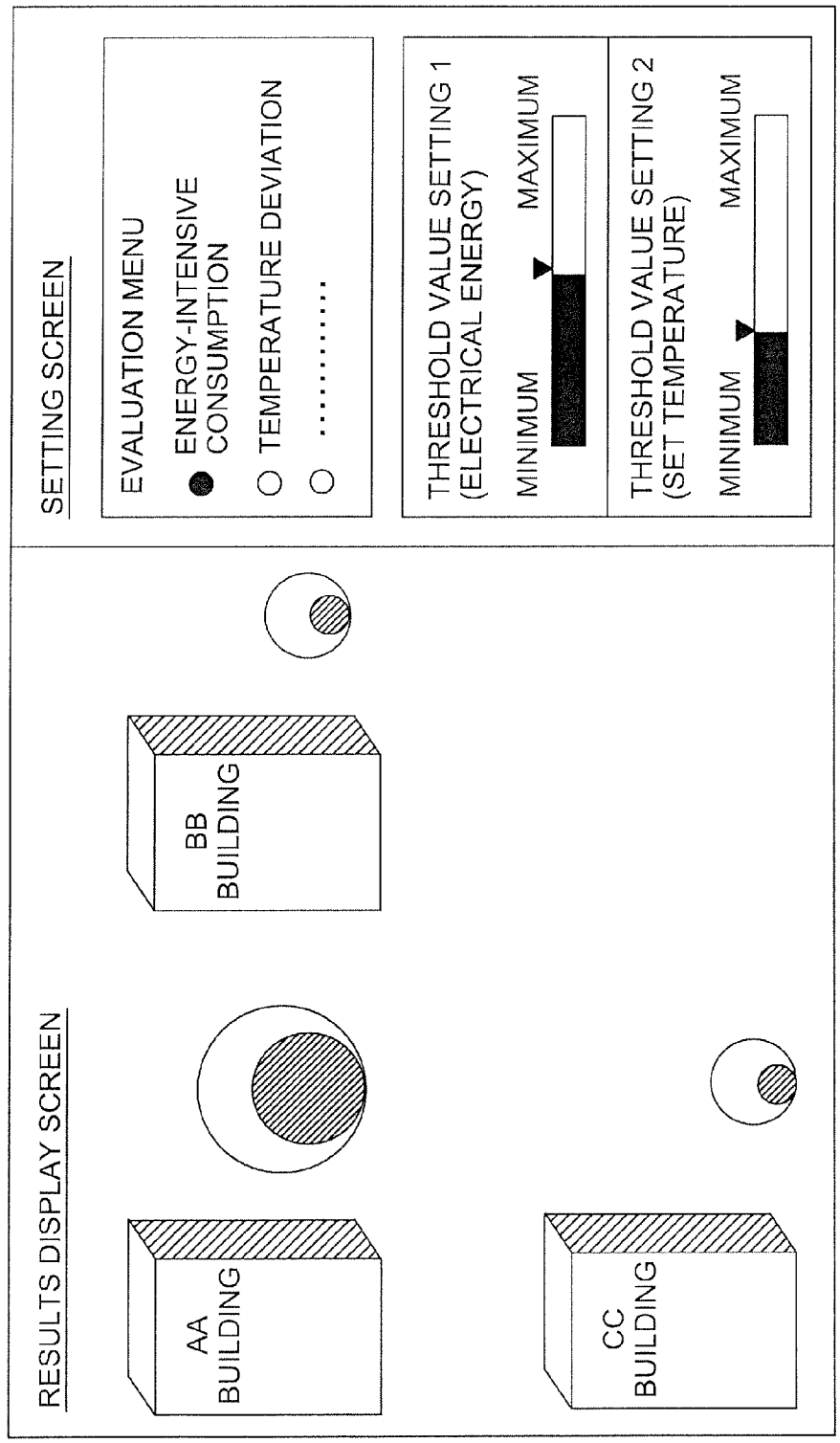
FIG. 12 is a diagram showing an example of a management screen of the group management apparatus pertaining to modification (2) pertaining to the embodiment.

Moreover, as shown in FIG. 11, instead of a table, graphics or the like may also be used to depict the magnitude relations of the combined values Ens. That is, the magnitude relations of the combined values Ens of state values equal to or greater than the reference value Es are depicted by changing the sizes of the graphics. Thus, an evaluation of the indoor unit groups 15a, 15b, and 15c inside the property 1 can be more easily performed. Further, total state values Ent (see FIG. 8) may also be displayed in addition to the combined values Ens of state values equal to or greater than the reference value Es. For example, as shown in FIG. 12, the total electrical energy consumption combined values Ent of the indoor unit groups 15a, 15b, and 15c are displayed together with the combined values Ens of state values equal to or greater than the reference value Es. That is, by displaying both the combined values Ens of electrical energy consumption values equal to or greater than the reference value Es and the total electrical energy consumption combined values Ent of the indoor unit groups 15a, 15b, and 15c including the combined values Ens, the proportions of the combined values Ens of electrical energy consumption values equal to or greater than the reference value Es occupying the total electrical energy consumption combined values Ent can be determineed. Thus, the indoor unit groups 15a, 15b, and 15c that include many energy conservation targets can be easily identified. Specifically, AA building can be judged to be energy-intensive/wasteful. That is, its total electrical energy consumption combined value Ent is large and its combined value Ens of electrical energy consumption values equal to or greater than the reference value Es is also large. Consequently, AA building can be considered a building for which an energy conservation measure is needed. Further, BB building can be judged to be energy-intensive/energy-conserving. That is, its total electrical energy consumption combined quantity Ent is large, but its combined value Ens of electrical energy consumption values equal to or greater than the reference value Es is small. Consequently, it can be judged that, in comparison to the other buildings, an energy conservation measure is being sufficiently taken.

(3) In the above-described embodiment, energy-intensive consumption and temperature deviation served as the evaluation items, but other items may also serve as the evaluation items. For example, comfort may also be added to the evaluation items. In this case, the state values compared with the reference value are discomfort indices, for example.

Further, in the above-described embodiment, the reference value setting component 35d set the predetermined reference value Es on the basis of the content set by the threshold value setting areas 70ba and 70bb, but the reference value setting component 35d may also set the reference value Es in consideration of secondary elements shown in FIG. 13. For example, the indoor units 12aa to 12ac, 12ba to 12bc, 12ca to 12cc, . . . whose electrical energy consumption in one day is equal to or greater than 12 kWh and whose COP is equal to or greater than 3.0 may be compared and contrasted. Moreover, the reference value setting component 35d may also be designed such that it can automatically set the reference value Es on the basis of these pieces of information.

Figure 14:
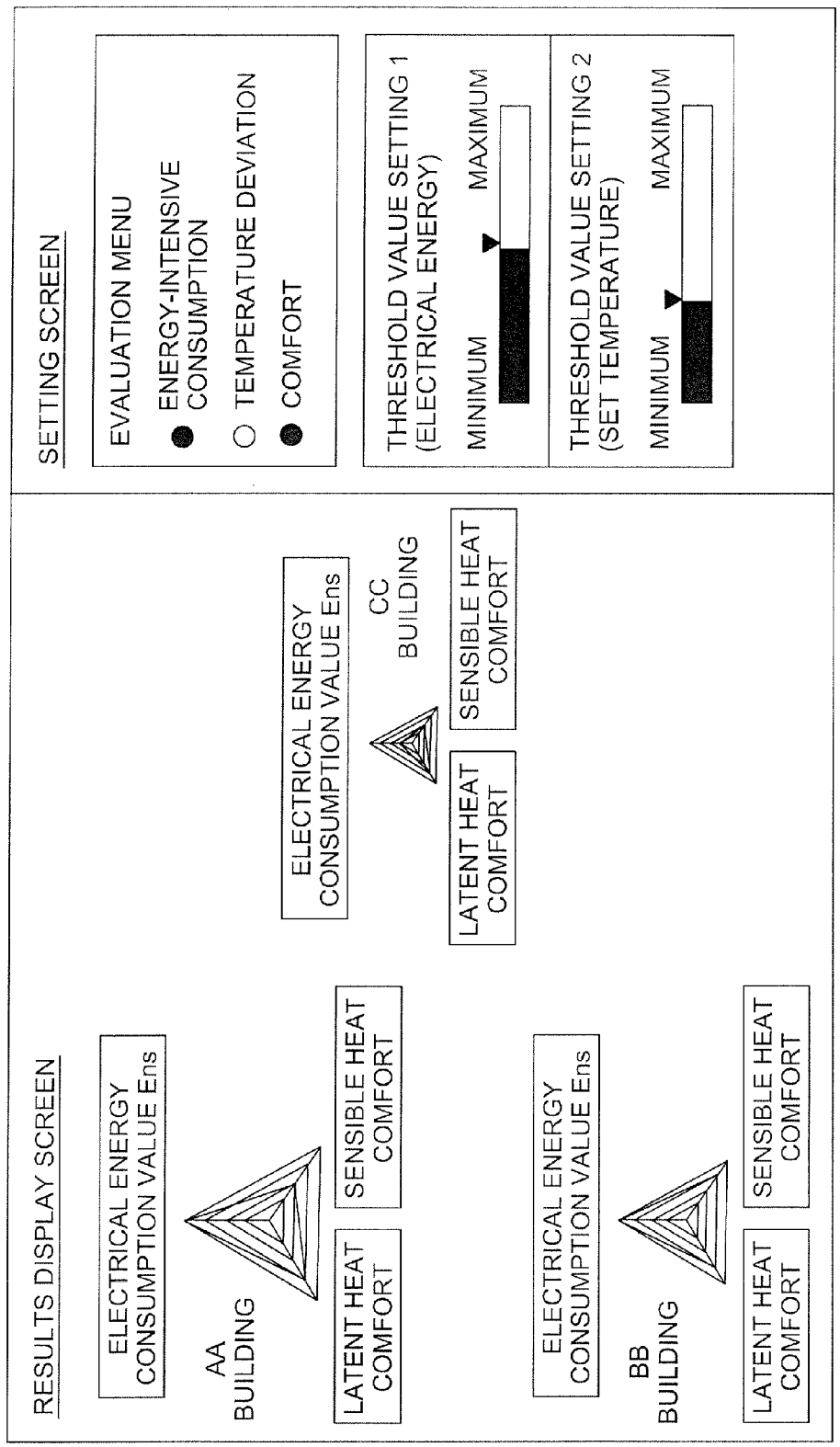
FIG. 14 is a diagram showing an example of a management screen of the group management apparatus pertaining to modification (4) pertaining to the embodiment.

(4) Moreover, the group management apparatus 30 may also be designed such that an en bloc evaluation whose evaluation axis is multi-axial is displayed on the results evaluation screen 71. For example, as shown in FIG. 14, the combined values Ens of electrical energy consumption values equal to or greater than the reference value Es, sensible heat comfort, and latent heat comfort are placed and displayed en bloc with radar charts. At the same time, a multi-axial evaluation can be performed en bloc by using the sizes of the radar charts to show the total electrical energy consumption combined values Ent.

(5) In the above-described embodiment, the group management apparatus 30 may also be connected via the Internet or the like to a remote management server installed in a service center or the like that is remote of the management domain 1. Moreover, numerous types of controllers installed in numerous properties outside the management domain may also be connected to that remote management server.

(6) In the above-described embodiment, the group management apparatus 30 may also be designed to bear all or part of the processing by the controllers 20a, 20b, and 20c. Thus, the group management apparatus 30 can manage the indoor units 12aa to 12ac, 12ba to 12bc, 12ca to 12cc, . . . without the intervention of the controllers 20a, 20b, and 20c.

(7) In the above-described embodiment, the group management apparatus 30 may manage not only the indoor units 12aa to 12ac, 12ba to 12bc, 12ca to 12cc, . . . but also other installation devices such as, for example, illumination devices, water supply and drainage devices, humidifiers, elevators, disaster prevention devices, etc.

(8) In the above-described embodiment, the group management apparatus 30 may also be configured such that the outdoor units 11a, 11b, and 11c can also be managed like the indoor units 12aa to 12ac, 12ba to 12bc, 12ca to 12cc, . . . via the management screen displayed on the group management display unit 32.

(9) In the above-described embodiment, the group management apparatus 30 compared the state values of the individual indoor units 12aa to 12ac, 12ba to 12bc, 12ca to 12cc, . . . with the reference value Es, but the group management apparatus 30 may also be designed to compare collective state values of all the indoor units 12aa to 12ac, 12ba to 12bc, 12ca to 12cc, . . . belonging to the groups with the reference value Es. The collective state values are, for example, mean values of the state values or combined values of the state values of the indoor units 12aa to 12ac, 12ba to 12bc, 12ca to 12cc, . . . belonging to the groups. Thus, for example, if the y-axis represents latitude and the x-axis represents collective mean electrical energy consumption, judgments such as cooling becoming moderate the higher the latitude is can be made.

(10) In the above-described embodiment, there has been exemplified an aspect where the group management apparatus 30 is installed inside a management domain in a property such as a university or a hospital in which a plurality of buildings are located in a single management domain, but even when the single management domain extends over a wide area such as throughout Japan or countries throughout the entire world, the group management apparatus 30 can also be applied by connecting it via a line such as the Internet. For example, when several facilities of a university are scattered in several prefectures and municipalities throughout Japan or when the branches of a business are scattered in many parts of the country, the operating states of the installation devices in all of the facilities can be determined in one view.

<Other Embodiments>

Embodiments of the present invention have been described above on the basis of the drawings, but the specific configurations thereof are not limited to the embodiments and can be altered in a scope that does not depart from the gist of the invention.

Industrial Applicability

The present invention is useful as a group management apparatus or a group management system with which the operating states of numerous installation devices can be seen in one view and can be fairly evaluated in a single management domain in which a plurality of buildings are located.

What is claimed is:

1. A group management apparatus configured to manage, as a plurality of groups, numerous installation devices installed in a plurality of buildings, the group management apparatus comprising:

an acquiring component configured to acquire operating data of the numerous installation devices via controllers, the operating data being indicative of at least current operating conditions, each of the current operating conditions being one of energy-intensive consumption and temperature deviation, the controllers being placed in the buildings and controlling the numerous installation devices inside the buildings;

a summarizing component configured to
summarize collective operating data values of the plurality of groups of installation devices, each collective operating data value being indicative of a collective current operating condition of each respective group,
compare the collective operating data values of the plurality of groups with each other, and
judge whether or not the collective operating data value of each group meets a predetermined condition, the predetermined condition being met by one of the collective operating data values of a respective group being equal to or greater than a threshold value; and a screen generating component configured to generate a screen in which results, with respect to the plurality of groups, of the collective operating data values having been summarized by the summarizing component are juxtaposed.

2. The group management apparatus according to claim 1, wherein
the summarizing component is further configured to compare
individual operating data values that are operating data values of individual installation devices belonging to single groups with individual operating data values of other groups.

3. The group management apparatus according to claim 2, wherein
the summarizing component is further configured to judge whether or not the individual operating data values meet the predetermined condition.

4. The group management apparatus according to claim 3, wherein
the summarizing component is further configured to compare, per group, the individual operating data values or the collective operating data values with a predetermined reference value, and to judge whether or not the individual operating data values or the collective operating data values meet the predetermined condition based on the comparison.

5. The group management apparatus according to claim 4, further comprising
a reference value setting component configured to set the predetermined reference value based on the operating data that have been acquired from the numerous installation devices by the acquiring component.

6. The group management apparatus according to claim 3, wherein
the screen generating component is further configured to generate a screen in which magnitude relations of installation devices meeting the predetermined condition in each of the groups can be compared.

7. The group management apparatus according to claim 6, wherein
the screen generating component is further configured to generate a screen in which specific values that are the individual operating data values of installation devices meeting the predetermined condition can be compared with overall values that are the operating data values of all installation devices.

8. The group management apparatus according to claim 7, wherein
the summarizing component is further configured to determine numbers of installation devices meeting the predetermined condition in each of the groups, and
the screen generating component is further configured to include the numbers in the screen.

9. The group management apparatus according to claim 6, wherein
the magnitude relations are displayed graphically.

10. The group management apparatus according to claim 6, wherein
the comparison of magnitude relations includes graphically juxtaposing the magnitude of a first of the collective operating data values that exceeds a threshold value against the magnitude of a second of the collective operating values indicative of total operation, the total operation including operation corresponding to collective operating data values exceeding the threshold value and operation corresponding to collective operating data values which do not exceed the threshold value.

11. The group management apparatus according to claim 2, wherein
the collective operating data values are mean values of the individual operating data values of installation devices belonging to single groups.

12. The group management apparatus according to any one of claims 2, wherein
the collective operating data values are totals of the individual operating data values of installation devices belonging to single groups.

13. The group management apparatus according to claim 2, further comprising
a classification information storage area configured to store classification information used to classify the numerous installation devices into the groups,
the summarizing component being further configured to summarize the individual operating data values or the collective operating data values per each group into which the numerous installation devices have been classified by the classification information.

14. The group management apparatus according to claim 1, further comprising
an evaluation item storage area configured to store a plurality of items for evaluating the current operating conditions of the numerous installation devices,
the summarizing component being further configured to evaluate the current operating conditions based on several items of the plurality of items or all items of the plurality of items, and
the screen generating component being further configured to generate a screen in which evaluation results based on the plurality of items can be checked en bloc.

15. The group management apparatus according to claim 1, wherein.
the plurality of buildings are included in a single management domain.

16. A group management system configured to manage, as a plurality of groups, numerous installation devices installed in a plurality of buildings, the group management system comprising:
controllers placed in the buildings and controlling the numerous installation devices installed inside the buildings; and
a group management apparatus connected to the controllers and managing the numerous installation devices as groups via the controllers, the group management apparatus including
an acquiring component configured to acquire operating data of the numerous installation devices via the controllers, the operating data being indicative of at least current operating conditions, each of the current operating conditions being one of energy-intensive consumption and temperature deviation,
a summarizing component configured to
summarize collective operating data values of the plurality of groups of installation devices, each collective operating data value being indicative of a collective current operating condition of each respective group,
compare the collective operating data values of the plurality of groups with each other, and
judge whether or not the collective operating data value of each group meets a predetermined condition, the predetermined condition being met by one of the collective operating data values of a respective group being equal to or greater than a threshold value, and
a screen generating component configured to generate a screen in which results, with respect to the plurality of groups, of the collective operating data values having been summarized by the summarizing component are juxtaposed.

17. A group management method of managing, as a plurality of groups, numerous installation devices installed in a plurality of buildings, the group management method comprising:
acquiring operating data of the numerous installation devices via controllers, the operating data being indicative of at least current operating conditions, each of the current operating conditions being one of energy-intensive consumption and temperature deviation, the controllers being placed in the buildings and controlling the numerous installation devices inside the buildings;
summarizing collective operating data values of the plurality of groups of installation devices, each collective operating data value being indicative of a collective current operating condition of each respective group;
comparing the collective operation data values of the plurality of groups with each other;
judging whether or not the collective operating data value of each group meets a predetermined condition, the predetermined condition being met by one of the collective operating data values of a respective group being equal to or greater than a threshold value; and
generating a screen in which results, with respect to the plurality of groups, of the collective operating data values having been summarized are juxtaposed.

18. A group management program configured to be executed in a computer to manage, as a plurality of groups, numerous installation devices installed in a plurality of buildings, the group management program comprising:
acquiring operating data of the numerous installation devices via controllers, the operating data being indicative of at least current operating conditions, each of the current operating conditions being one of energy-intensive consumption and temperature deviation, the controllers being placed in the buildings and controlling the numerous installation devices inside the buildings;
summarizing collective operating data values that are values of the plurality of groups of installation devices, each collective operating data value being indicative of a collective current operating condition of each respective group;

comparing the collective operating data values of the plurality of group with each other;

judging whether or not the collective operating data value of each group meets a predetermined condition, the predetermined condition being met by one of the collective operating data values of a respective group being equal to or greater than a threshold value; and generating a screen in which results, with respect to the plurality of groups, of the collective operating data values having been summarized are juxtaposed.

* * * * *